(12) United States Patent
Sugimoto et al.

(10) Patent No.: US 8,893,305 B2
(45) Date of Patent: Nov. 18, 2014

(54) ACCESS RESTRICTED FILE AND ACCESS RESTRICTED FILE CREATING

(75) Inventors: Yasuaki Sugimoto, Hachioji (JP); Hirohiko Yamazaki, Machida (JP)

(73) Assignee: Konica Minolta Business Technologies, Inc. (JP)

( * ) Notice: Subject to any disclaimer, the term of this patent is extended or adjusted under 35 U.S.C. 154(b) by 916 days.

(21) Appl. No.: 12/691,221

(22) Filed: Jan. 21, 2010

(65) Prior Publication Data
US 2010/0192234 A1    Jul. 29, 2010

(30) Foreign Application Priority Data

Jan. 29, 2009 (JP) ................................. 2009-018676

(51) Int. Cl.
G06F 21/00 (2013.01)
G06F 21/62 (2013.01)
G06F 21/60 (2013.01)
G06F 3/12 (2006.01)

(52) U.S. Cl.
CPC .......... *G06F 21/6209* (2013.01); *G06F 21/608* (2013.01); *G06F 3/1225* (2013.01); *G06F 3/1288* (2013.01)
USPC ............................................... 726/30; 726/4

(58) Field of Classification Search
None
See application file for complete search history.

(56) References Cited

U.S. PATENT DOCUMENTS

| | | | | |
|---|---|---|---|---|
| 6,047,376 A | | 4/2000 | Hosoe ........................... | 713/201 |
| 6,553,492 B1 | | 4/2003 | Hosoe ........................... | 713/153 |
| 2003/0217275 A1 | | 11/2003 | Bentley et al. ................ | 713/184 |
| 2005/0114672 A1 | * | 5/2005 | Duncan et al. ................ | 713/182 |
| 2005/0149759 A1 | * | 7/2005 | Vishwanath et al. ......... | 713/201 |
| 2007/0056042 A1 | * | 3/2007 | Qawami et al. ................ | 726/26 |
| 2007/0086054 A1 | * | 4/2007 | Ikeno ........................... | 358/1.16 |
| 2008/0034127 A1 | * | 2/2008 | Nishio ........................... | 710/11 |
| 2008/0098098 A1 | * | 4/2008 | Onsen ........................... | 709/222 |
| 2008/0130899 A1 | * | 6/2008 | Iwamoto et al. .............. | 380/278 |
| 2008/0201783 A1 | | 8/2008 | Tamai ............................ | 726/28 |
| 2010/0189459 A1 | * | 7/2010 | Takase ........................... | 399/82 |

FOREIGN PATENT DOCUMENTS

| | | |
|---|---|---|
| JP | 10-177554 A | 6/1998 |
| JP | 2004-86441 A | 3/2004 |
| JP | 2005-227380 A | 8/2005 |
| JP | 2005-309881 A | 11/2005 |
| JP | 2008-204070 A | 9/2008 |
| WO | WO 03/096585 A1 | 11/2003 |

OTHER PUBLICATIONS

Japanese Notice of Reasons for Refusal for Patent Application No. 2009-018676, drafted Jul. 28, 2011, mailed Aug. 9, 2011, with English translation.

(Continued)

Primary Examiner — Jeffery Williams
(74) Attorney, Agent, or Firm — Cantor Colburn LLP

(57) ABSTRACT

Disclosed are an access restricted file and an restricted file creating apparatus for creating the access restricted file concerned, which makes it possible for an information processing apparatus to request a management server to determine whether the access right is present or absent. The apparatus includes a creating section to create the access restricted file that includes data, an accessing operation for which is restricted, and confirming destination information that represents the management server that confirms a presence or absence of the access right in regard to the operation for accessing the data. On the other hand, the access restricted file includes a program, being executable by a CPU of the information processing apparatus provided with a communicating function, to cause the CPU to perform a processing for requesting the management server, represented by the confirming destination information, to confirm the presence or absence of the access right.

10 Claims, 32 Drawing Sheets

(56) References Cited

OTHER PUBLICATIONS

Notice of Reasons for Refusal for Japanese Patent Application No. 2009-018676, drafted Nov. 29, 2011, with English translation.
Notice of Allowance for Japanese Patent Application No. 2009-018676, drafted Feb. 14, 2012, with English translation.
Japanese Notification of Reasons for Refusal dated Jan. 18, 2011, for counterpart Japanese Application No. 2009-018676, together with an English translation thereof.
Extended European Search Report dated Apr. 19, 2011, for counterpart European Application No. 10151567.4.
Japanese Notification of Reasons for Refusal dated May 11, 2011, for counterpart Japanese Application No. 2009-018676, together with an English translation thereof.
Second Notification of Reasons for Refusal for Chinese Application No. 201010105142.6, mailed Jan. 14, 2013, with English translation.

* cited by examiner

FIG. 6

| BYTE | DATA | COMMENT |
|---|---|---|
| BYTE 0 | HEADER | ATTRIBUTES INFORMATION OF PACKET<br><br>CODE FOR DISCRIMINATING THREE SIGNALS INDICATED AS FOLLOWS<br><br>1. COMMAND SIGNAL<br>2. ACK SIGNAL<br>3. RESULT SIGNAL |
| BYTE 1 | IDENTICAL CODE | ID CODE DEFINED FOR EVERY ATTRIBUTE (OPERATION CODE)<br><br>CODE FOR DISCRIMINATING EACH KIND OF COMMAND SIGNAL FROM PLURAL KINDS OF COMMAND SIGNALS (ABOVEMENTIONED IS ALSO APPLIED TO ACK SIGNAL AND RESULT SIGNAL IN SAME MANNER) |
| BYTE 2 | PARAMETER | PARAMETER AREA<br><br>CONTENTS OF COMMUNICATION RESULT IN RESULT SIGNAL<br><br><DETAIL><br>[SUCCESS]//COMMAND; NORMAL COMPLETION<br>[ERROR 1]//COMMAND; ABNORMAL COMPLETION<br>[ERROR 2]//SEQUENCE; ERROR<br>[ERROR 3]//TIMEOUT; ERROR |
| BYTE 3- | ATTACHED DATA | GENERAL PURPOSE DATA TO BE ATTACHED<br><br>IN EMBODIMENT, FOLLOWING DATA ARE TO BE ATTACHED<br><br>[ENCRYPTION OBJECTIVE DATA]<br>[RESTRICTED FILE]<br>[APPLICATION PROGRAM] |

ACCESS RESTRICTED FILE AND ACCESS RESTRICTED FILE CREATING

This application is based on Japanese Patent Application NO. 2009-018676 filed on Jan. 29, 2009, with Japan Patent Office, the entire content of which is hereby incorporated by reference.

BACKGROUND OF THE INVENTION

The present invention relates to an access restricted file to which an access restriction is applied by employing a cryptographic method, etc., and an access restricted file creating apparatus that creates the access restricted file concerned.

Generally speaking, when certain important data is taken out to an external environment and/or distributed over the external environment, an access restriction processing, employing a cryptographic method, etc., is applied to the data concerned.

If the concerned data was simply encrypted on that occasion, it becomes impossible to monitor and maintain the security of the data concerned, in case that a key of cryptograph has been obtained by using a certain illegal method and the encrypted data has been decrypted by using the above-obtained key of cryptograph. Further, after the encrypted data provided with an access restriction has been distributed widely, there would possibly occur such a case that the user (or manager) wishes to change the contents of restriction information, such as heightening the security level of the concerned data, changing the current password, etc.

With respect to the print restriction of document data, Tokkai 2005-309881 (Japanese Patent Application Laid-Open Publication) sets forth a system for which the above-mentioned problems and demands are taken into account. The disclosed system is so constituted that the management server controls the restriction information, such as a key of cryptograph, IDs (Identification) of a printer and a document allowed to be used for printing, etc., while the printer, which is instructed to conduct an operation for printing a document based on the encrypted document data, transmits the document ID of the encrypted document data concerned and the printer ID of its own, etc., to the management server so as to inquire an allowance or disallowance of the concerned printing operation, and then, only in the case of allowance, the printer decrypts the encrypted document data by using the key of cryptograph owned by the management server so as to implement the printing operation based on the decrypted document data. According to the above-disclosed system, the access restriction can be achieved by employing the restriction information, such as the printer ID, the document ID, etc., and in addition, by changing the restriction information to be registered into the management server, it is possible to change the conditions for determining the allowance or disallowance of the concerned printing operation.

According to the technology set forth in the Tokkai 2005-309881, when the user has taken out important encrypted data to a remote destination site of a business trip or the like, the printer that can print an image based on the encrypted data is limited to only such a printer that is provided with a function for accessing the management server. For this reason, unless the printer provided with such the function exists in the remote destination site, it is impossible for the user to decrypt the encrypted data so as to print an image represented by the decrypted data, even though it is possible to change the restriction information registered in the management server (for instance, the printer ID of the printer allowed to be used for printing).

SUMMARY OF THE INVENTION

To overcome the abovementioned drawbacks in conventional systems, it is one of objects of the present invention to provide an access restricted file and an restricted file creating apparatus for creating the access restricted file concerned, which makes it possible for the information processing apparatus to request the management server to determine whether the access right is present or absent.

Accordingly, at least one of the objects of the present invention can be attained by any one of the access restricted files and the restricted file creating apparatuses described as follows.

(1) According to an access restricted file reflecting an aspect of the present invention, the access restricted file comprises: data, wherein an operation for accessing the data is restricted; and confirming destination information that represents a management server serving as a confirming destination site to confirm a presence or absence of an access right in regard to the operation for accessing the data.

(2) According to another aspect of the present invention, the access restricted file recited in item 1 further comprises: a program, being executable by a CPU (Central Processing Unit) of an information processing apparatus provided with a communicating function, to cause the CPU to perform a processing for requesting the management server, represented by the confirming destination information, to confirm the presence or absence of the access right.

(3) According to still another aspect of the present invention, the access restricted file recited in item 1 further comprises: a program, being executable by a CPU (Central Processing Unit) of an information processing apparatus provided with a communicating function, to cause the CPU to acquire such another program that is also executable by the CPU of the information processing apparatus, to cause the CPU to perform a processing for requesting the management server, represented by the confirming destination information, to confirm the presence or absence of the access right.

(4) According to still another aspect of the present invention, in the access restricted file recited in item 2 or item 3, when the information processing apparatus receives a request for applying a predetermined operation to the data, the program is executed by the CPU of the information processing apparatus so as to cause the CPU to request the management server to confirm the presence or absence of the access right; and when the information processing apparatus confirms the presence of the access right from the management server, the program is executed by the CPU of the information processing apparatus so as to cause the CPU to allow the information processing apparatus to apply the predetermined operation to the data, while, when the information processing apparatus confirms the absence of the access right from the management server, the program is executed by the CPU of the information processing apparatus so as to cause the CPU to ban the information processing apparatus from applying the predetermined operation to the data.

(5) According to still another aspect of the present invention, in the access restricted file recited in item 4, when a predetermined time interval has elapsed since the predetermined operation has been applied to the data, the program is executed by the CPU of the information processing apparatus so as to cause the CPU to again request the management server to confirm the presence or absence of the access right; and when the information processing apparatus confirms the presence of the access right from the management server, the program is executed by the CPU of the information processing apparatus so as to cause the CPU to allow the information processing apparatus to continuously apply the predetermined operation to the data, while, when the information processing apparatus confirms the absence of the access right from the management server, the program is executed by the CPU of the information processing apparatus so as to cause the CPU to ban the information processing apparatus from further applying the predetermined operation to the data.

(6) According to still another aspect of the present invention, in the access restricted file recited in item 4, the predetermined operation is at least one of an operation for commencing an accessing operation of the data, another operation for changing accessing pages represented by the data, still another operation for updating the data, still another operation for conducting an printing operation based on the data and yet another operation for conducting an copying operation based on the data.

(7) According to still another aspect of the present invention, in the access restricted file recited in any one of items 2-6, the program is executed by the CPU of the information processing apparatus so as to cause the CPU to input collating information to be used for confirming the presence or absence of the access right and to add the collating information to the access restricted file so as to request the management server to confirm the presence or absence of the access right.

(8) According to still another aspect of the present invention, in the access restricted file recited in any one of items 2-7, the data is encrypted data.

(9) According to a restricted file creating apparatus reflecting still another aspect of the present invention, the restricted file creating apparatus, comprising: a network communication section to communicate with a management server; and a creating section to create an access restricted file that includes data, an accessing operation for which is restricted, and confirming destination information that represents the management server serving as a confirming destination site to confirm a presence or absence of an access right in regard to the operation for accessing the data.

(10) According to still another aspect of the present invention, the restricted file creating apparatus recited in item 9, further comprises: a condition registering section to register condition information for confirming the presence or absence of the access right into the management server.

(11) According to still another aspect of the present invention, in the restricted file creating apparatus recited in item 9 or item 10, the access restricted file further includes a program, being executable by a CPU (Central Processing Unit) of an information processing apparatus provided with a communicating function, to cause the CPU to perform a processing for requesting the management server, represented by the confirming destination information, to confirm the presence or absence of the access right.

(12) According to still another aspect of the present invention, in the restricted file creating apparatus recited in item 9 or item 10, wherein the access restricted file further includes a program, being executable by a CPU (Central Processing Unit) of an information processing apparatus provided with a communicating function, to cause the CPU to acquire such another program that is also executable by the CPU of the information processing apparatus, to cause the CPU to perform a processing for requesting the management server, represented by the confirming destination information, to confirm the presence or absence of the access right.

(13) According to still another aspect of the present invention, in the restricted file creating apparatus recited in item 11, when the information processing apparatus receives a request for applying a predetermined operation to the data, the program is executed by the CPU of the information processing apparatus so as to cause the CPU to request the management server to confirm the presence or absence of the access right; and when the information processing apparatus confirms the presence of the access right from the management server, the program is executed by the CPU of the information processing apparatus so as to cause the CPU to allow the information processing apparatus to apply the predetermined operation to the data, while, when the information processing apparatus confirms the absence of the access right from the management server, the program is executed by the CPU of the information processing apparatus so as to cause the CPU to ban the information processing apparatus from applying the predetermined operation to the data.

(14) According to still another aspect of the present invention, in the restricted file creating apparatus recited in item 13, when a predetermined time interval has elapsed since the predetermined operation has been applied to the data, the program is executed by the CPU of the information processing apparatus so as to cause the CPU to again request the management server to confirm the presence or absence of the access right; and when the information processing apparatus confirms the presence of the access right from the management server, the program is executed by the CPU of the information processing apparatus so as to cause the CPU to allow the information processing apparatus to continuously apply the predetermined operation to the data, while, when the information processing apparatus confirms the absence of the access right from the management server, the program is executed by the CPU of the information processing apparatus so as to cause the CPU to ban the information processing apparatus from further applying the predetermined operation to the data.

(15) According to still another aspect of the present invention, in the restricted file creating apparatus recited in item 13, the predetermined operation is at least one of an operation for commencing an accessing operation of the data, another operation for changing accessing pages represented by the data, still another operation for updating the data, still another operation for conducting an printing operation based on the data and yet another operation for conducting an copying operation based on the data.

(16) According to still another aspect of the present invention, in the restricted file creating apparatus recited in any one of items 11-15, the program is executed by the CPU of the information processing apparatus so as to cause the CPU to input collating information to be used for confirming the presence or absence of the access right and to add the collating information to the access restricted file so as to request the management server to confirm the presence or absence of the access right.

(17) According to yet another aspect of the present invention, in the restricted file creating apparatus recited in any one of items 11-16, the data is encrypted data, and the creating section encrypts plain sentences so as to create the encrypted data.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 shows a table indicating detailed contents of information to be stored in each of storing areas included in various kinds of control signals;

DETAILED DESCRIPTION OF THE PREFERRED EMBODIMENT

Figure 1:
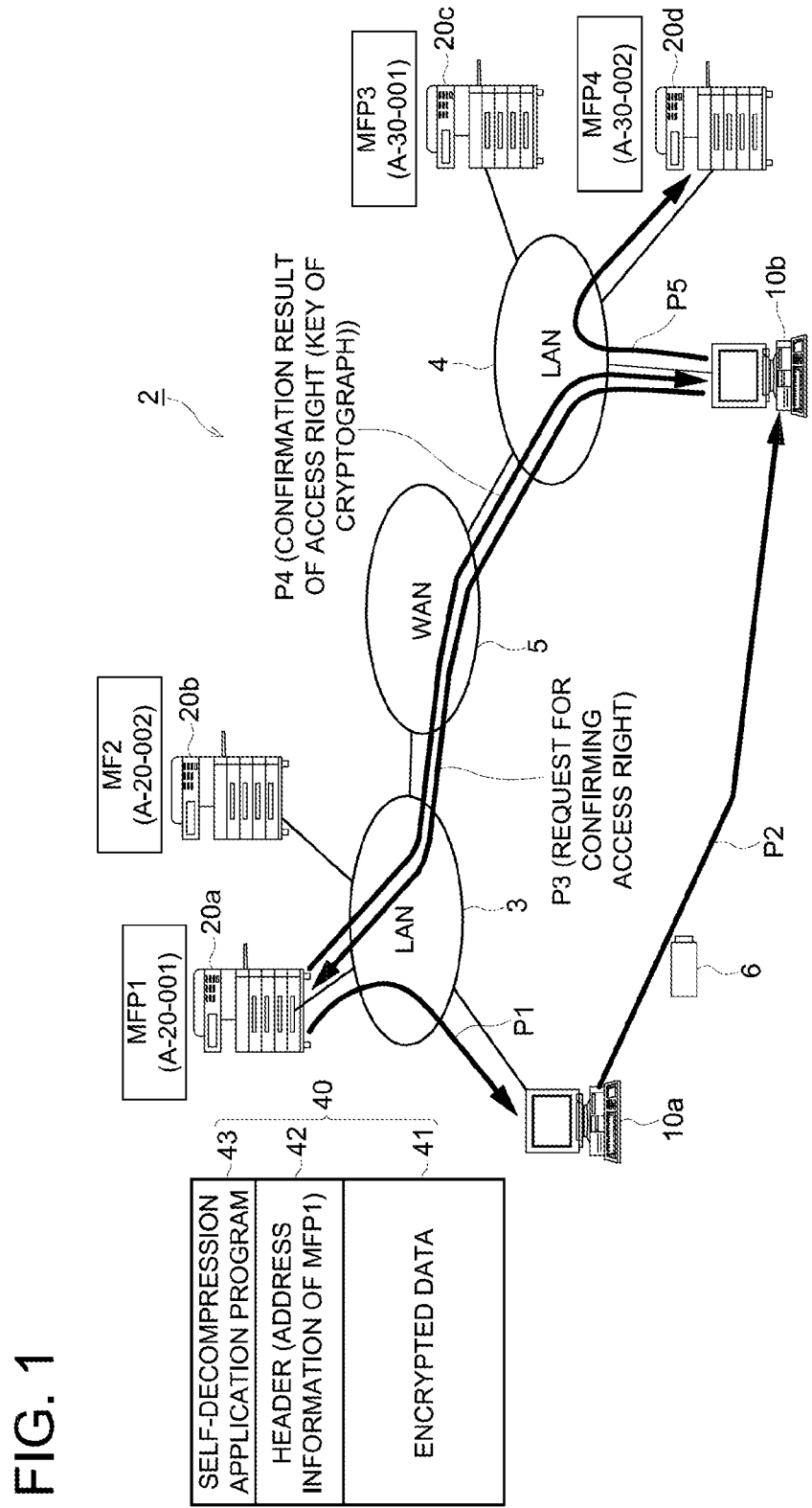
FIG. 1 shows an explanatory schematic diagram indicating an exemplary configuration of a printing system embodied in the present invention.

Referring to the drawings, the preferred embodiment of the present invention will be detailed in the following.

FIG. 1 shows a schematic diagram indicating an exemplary configuration of a printing system 2 embodied in the present invention. The printing system 2 is constituted by, an image forming apparatuses 20a, 20b, 20c, 20d, each of which also serves as an access-restricted file creating apparatus and a management server, (hereinafter, also referred to as an image forming apparatus 20 as its general reference numeral) and terminal devices 10a, 10b, each of which is a personal computer or the like (hereinafter, also referred to as a terminal device 10 as its general reference numeral). Those are coupled to each other through various kinds of networks. In this exemplary configuration, the image forming apparatuses 20a, 20b and the terminal device 10a are coupled to a first LAN (Local Area Network) 3, while the image forming apparatuses 20c, 20d and the terminal device 10b are coupled to a second LAN (Local Area Network) 4, and further, the first LAN 3 and the second LAN 4 are coupled to each other through a WAN (Wide Area Network) 5.

The image forming apparatus 20 is such an apparatus that is generally called an MFP (Multi Function Peripheral), which is provided with a copy function for optically reading an image residing on a document to print its copy image onto a recording paper sheet, a scanning function for creating a file into which the image data read from the document is stored and for transmitting the created file to an external terminal device, a printing function for forming an image, in regard to a print job received from the external terminal device being a personal computer or the like, onto the recording paper sheet so as to output the printed paper sheet, a facsimile function for transmitting and receiving the image data concerned, etc. In this connection, hereinafter, the image forming apparatus 20 is also referred to as the MFP.

Each of the image forming apparatuses 20 is attached with an individual apparatus ID (Identification). In the exemplary configuration shown in FIG. 1, the apparatus ID of the image forming apparatus 20a (MFP1) is defined as "A-20-001", the apparatus ID of the image forming apparatus 20b (MFP2) is defined as "A-20-002", the apparatus ID of the image forming apparatus 20c (MFP3) is defined as "A-30-001" and the apparatus ID of the image forming apparatus 20d (MFP4) is defined as "A-30-002". By using the above-defined apparatus IDs, it becomes possible for each of the image forming apparatuses to specify the MFP driver being currently available for the image forming apparatus concerned.

The image forming apparatus 20 is further provided with functions as the restricted file creating apparatus that encrypts the image data stored in its own storage and/or the data sent from the external terminal device, such as the terminal device 10, etc., and further, creates a restricted file 40 including such data that is formed by combining the above-created encrypted data with information for restricting various kinds of processing to be implemented at the time when decrypting the above-created encrypted data and/or to be applied to the decrypted data, such as an access start processing, an access page shift (page change) processing, a print processing, a change processing, a copy processing, etc.

The restricted file 40 is outputted from the image forming apparatus 20 to the terminal device 10 and utilized in the terminal device 10 serving as an output destination site. In addition, for instance, the restricted file 40 is stored into USB (Universal Serial Bus) storage 6, which is to be carried into an external environment, so as to use the restricted file 40 in a certain external apparatus. Even if the restricted file 40 is carried into the external environment, the restricted file 40 is provided with such a data structure that is available in an arbitral terminal device, while maintaining its security aspect.

Concretely speaking, the restricted file 40 is provided with such a data structure that includes an encrypted data 41, a header 42 and a self-decompression application program 43 serving as self-decompression type software. Confirming destination information (for instance, address information), indicating a management server serving as a destination site that confirms an accessing right in regard to the operation for decrypting the encrypted data 41 and the decrypted data, is registered in the header 42. The system, embodied in the present invention, is so constituted that the image forming apparatus 20, which has created the restricted file 40, also serves as the management server that confirms the accessing right for the above-created restricted file 40.

The self-decompression application program 43 included in the restricted file 40 is such a program that implements its self-decompression operation in response to a predetermined operation, such as a double clicking, etc., conducted for the restricted file 40 in an arbitral information processing apparatus having a communication function, so as to make the self-decompression application program 43 itself executable by the CPU. The self-decompression application program 43, after its self-decompression operation is completed, is executed to make the concerned information processing apparatus, which is provided with the communication function and into which the self-decompression application program 43 is loaded, implement the processing for requesting the operation for confirming the implementation right (access right) of various kinds of operations with respect to the operation for decrypting the encrypted data 41 and the decrypted data, to the management server indicated by the address information included in the header 42.

For instance, the utilizing mode of the restricted file 40 includes an operation (P1) for outputting the restricted file 40 created by applying the encryption processing to the image data in the image forming apparatus 20a, based on the request sent from the terminal device 10a coupled to the first LAN 3, and an operation (P2) for taking out a USB (Universal Serial Bus) storage 6 into which the above-created file is stored, in order to implement various kinds of operations with respect to the operation for decrypting the encrypted data 41 and the decrypted data in the terminal device 10b coupled to the second LAN 4. On that occasion, when the restricted file 40 is double-clicked in the terminal device 10b, the self-decompression application program 43, after its self-decompression operation is completed, is executed to read out the confirming destination information (for instance, address information) included in the header 42, so as to make the terminal device 10b request the management server indicated by the confirming destination information (image forming apparatus 20a) to confirm a presence or absence of the access right (P3). At the time when confirming a presence of the access right, the image forming apparatus 20a transmits the key of cryptograph to the terminal device 10b (P4). Receiving the key of cryptograph, the terminal device 10b employs the received key of cryptograph for decrypting the encrypted data 41 to implement the printing operation based on the decrypted data, etc. (P5).

Figure 2:
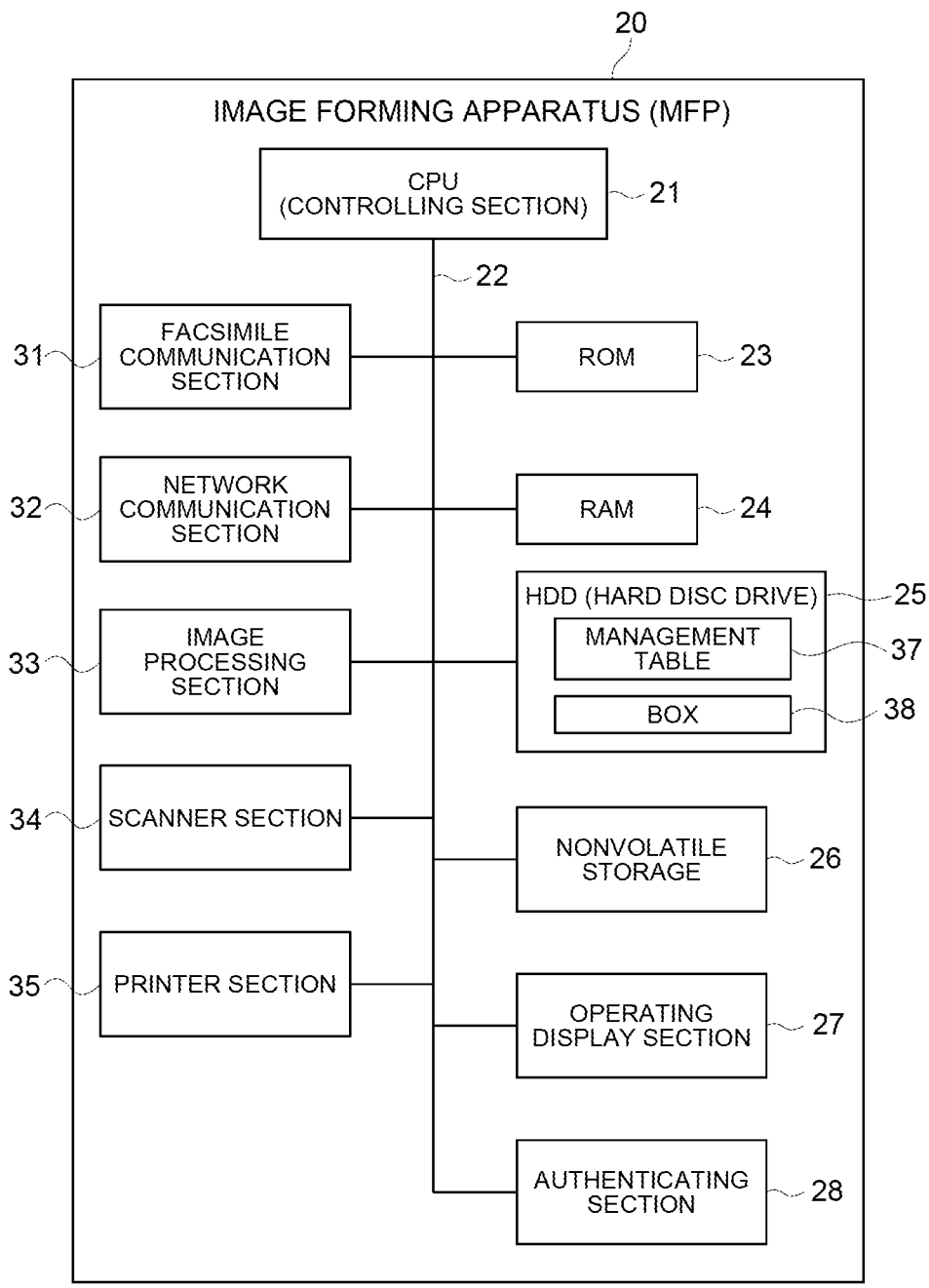
FIG. 2 shows a block diagram indicating a rough configuration of the image forming apparatus embodied in the present invention.

FIG. 2 shows a block diagram indicating a rough configuration of the image forming apparatus 20. The image forming apparatus 20 is constituted by a CPU (Central Processing Unit) 21 serving as a controlling section to control the overall operations to be conducted in the image forming apparatus 20, a ROM (Read Only Memory) 23, a RAM (Random Access Memory) 24, an HDD (Hard Disc Drive) 25, a non-volatile storage 26, an operating display section 27, an authenticating section 28, a facsimile communication section 31, a network communication section 32, an image processing section 33, a scanner section 34 and a printer section 35. The CPU 21 and the other abovementioned sections are coupled to each other through a bus 22.

The ROM 23 stores various kinds of programs therein, so that the CPU 21 executes each of the programs so as to implement each of the functions provided in the image forming apparatus 20. The RAM 24 stands for a Random Access Memory 24 that serves as various kinds of versatile storages, such as a working storage into which various kinds of data are temporarily stored when the CPU 21 executes the current program, an image data storage into which various kinds of image data are stored, a communication buffer storage into which data in regard to the transmitting and receiving operations are temporarily stored, etc.

The HDD 25 serves as a nonvolatile mass storage device. The HDD 25 stores a management table 37 to register various kinds of data in regard to the functions as the management server, therein. In addition, a box 38, serving as a memory area to be controlled for every user or every group, is also created in the HDD 25. Image data etc. are stored into the box 38. An operation for accessing the box 38 is restricted by employing a password, etc.

The nonvolatile storage 26 serves as a rewritable storage, which retains currently stored contents even if the electric power supplied from the power source is turned OFF. When the restricted file 40 is created by encrypting data, the nonvolatile storage 26 stores information (file path information) for locating the encryption objective data, etc., therein. Other than the above, the nonvolatile storage 26 also stores various kinds of setting contents established in regard to the image forming apparatus 20, user information, user authentication information, an apparatus ID, system information, address information of the image forming apparatus 20 concerned (such as an IP (Internet Protocol) address, a URL (Uniform Resource Locator) as the management server, etc.), a name and version information of an application program (MFP driver) being necessary for implementing communications with the image forming apparatus 20 concerned, etc., therein.

The operating display section 27 is constituted by a LCD (Liquid Crystal Display), a touch panel that is mounted over the LCD screen to detect a coordinate position at which the touch panel is depressed by a finger, a touch pen or the like and various kinds of operating buttons, such as a ten key, a start button, etc., so as to display various kinds of screens, such as operating screens, setting screens, warning message screens, etc., on the LCD screen and to accept various kinds of operations conducted by the user. For instance, the user authenticating operation is achieved by accepting the user ID and the password inputted by the user from the operating display section 27, and then, by collating them with the user authentication information registered in advance. Other than the above, it is also applicable that the system is so constituted that the user authenticating operation is implemented by communicating with a individual authenticating wireless card possessed by the user currently residing near the image forming apparatus 20 so as to read out the user information from the wireless card concerned.

The facsimile communication section 31 performs various kinds of operations for controlling the facsimile transmission and the facsimile reception, such as a dialing operation, a call accepting operation, an operation for establishing a connection with telephone line, etc.

The network communication section 32 implements a function for communicating with the other image forming apparatus 20 and/or the terminal device 10 through the network, such as the LAN, etc., so as to transmit and receive various kinds of data and information.

The image processing section 33 is provided with functions for applying various kinds of image processing to image data, such as a rasterizing operation for converting the print data received from the terminal device 10 to image data (bitmap data), an image data compression/expansion processing, a data encryption/decryption processing, an image rotation processing, etc.

The scanner section 34 implements a function for optically reading an image residing on the document so as to acquire image data representing the image concerned. For instance, the scanner section 34 is constituted by a light source to emit a light beam to be scanned on the document, a line image sensor to convert the light beam reflected from the document to electric signals for every scanning line in a width direction of the document, a reading position shift mechanism to sequentially shift the reading position toward a longitudinal direction of the document in a unit of every scanning line, an optical path, including lenses, mirrors, etc., to introduce and focus the light beam reflected from the document onto the line image sensor, an analogue to digital converter to convert the analogue image signals outputted by the line image sensor to the digital image data, etc.

The printer section 35 implements a function for printing the image represented by the digital image data onto the recording paper sheet. The printer section 35 is constituted by various kinds of structural elements being necessary for an image forming process employing the electro-photographic method, such as a conveyance mechanism for conveying the recording paper sheet, a photoreceptor drum, a charging device, a laser unit, a developing device, a transferring separation device, a cleaning section, a fixing device, etc. Accordingly, the printer section 35 is configured as a laser printer, so to speak. However, it is needless to say that another printer employing any other image forming method is also applicable as well.

Figure 3:
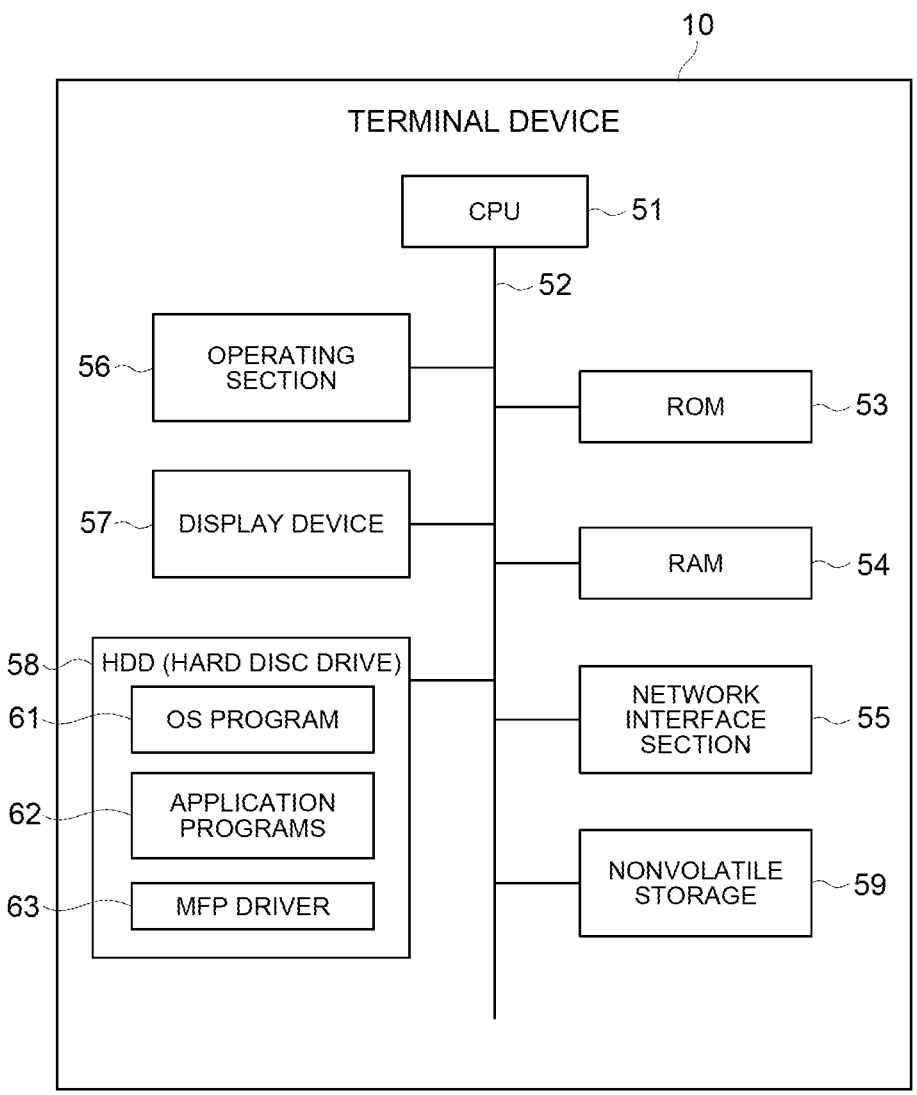
FIG. 3 shows a block diagram indicating a rough configuration of a terminal device.

FIG. 3 shows a block diagram indicating an exemplary configuration of the terminal device 10. The terminal device 10 is configured by installing a predetermined program into a general purpose PC (Personal Computer). The terminal device 10 is constituted by a CPU (Central Processing Unit) 51, a ROM (Read Only Memory) 53, a RAM (Random Access Memory) 54, a network interface section 55, an operating section 56, a display device 57, an HDD (Hard Disc Drive) 58, a nonvolatile storage 59, etc., which are coupled to each other through a bus 52.

The ROM 53 stores a boot program to be executed by the CPU 51 and various kinds of fixed data, therein. On the other hand, the nonvolatile storage 59 stores user information and a user ID of the user who use the terminal device 10 concerned, authenticating information of the user, identifying information of the terminal device 10 concerned (terminal device ID), an IP address, etc., therein.

Further, the HDD 58 stores an OS (Operating System) program 61, various kinds of application programs 62 to be executed on the OS program 61, a MFP (Multi Function Peripheral) driver 63, etc. When executing any one of the MFP driver 63 and the application programs 62, the CPU 51 reads out the concerned program from the HDD 58 and develops it on the RAM 54 so as to execute the concerned program developed on the RAM 54.

The operating section 56 is constituted by a keyboard, a mouse (pointing device), etc., so as to accept the user's operation for inputting documents, the user's instruction for implementing the operation for designating or processing the data and/or file serving as a printing object or an encrypting object. The display device 57 is constituted by a LCD (Liquid Crystal Display), etc., so as to display various kinds of screens, such as operating screens, setting screens, warning message screens, etc., on the LCD screen, based on the display data created by the MFP driver 63, the application programs 62 and the OS program 61. The network interface section 55 receives and transmits various kinds of data from/to the image forming apparatus 20, the other terminal device 10, etc., through the network, such as the first LAN 3, the second LAN 4, etc.

When receiving the operation for activating the restricted file 40, such as the double clicking operation, etc., the terminal device 10 activates the self-decompression application program 43 so as to conduct its self-decompressing operation, and then, implements a controlling operation to make the CPU 51 execute the self-decompressed application program concerned. Further, the CPU 51 executes the application programs 62, so as to conduct operations for accepting the instructions for accessing, copying, updating documents and/or images, etc., and to implement actions corresponding to the above-operations. Based on the self-decompressed application program concerned, the CPU 51 monitors the operations and the actions to be conducted on the basis of the application programs 62. Concretely speaking, the CPU 51 monitors the state that the accessing operation and various kinds of the other operations, to be conducted with respect to the decrypted data acquired by decrypting the encrypted data stored in the restricted file 40, are conducted through the application programs 62, so as to perform a processing for inquiring a presence or absence of the access right in regard to the accessing operation and the other operations from the management server indicated by the confirming destination information included in the header 42, to confirm it.

Figure 4:
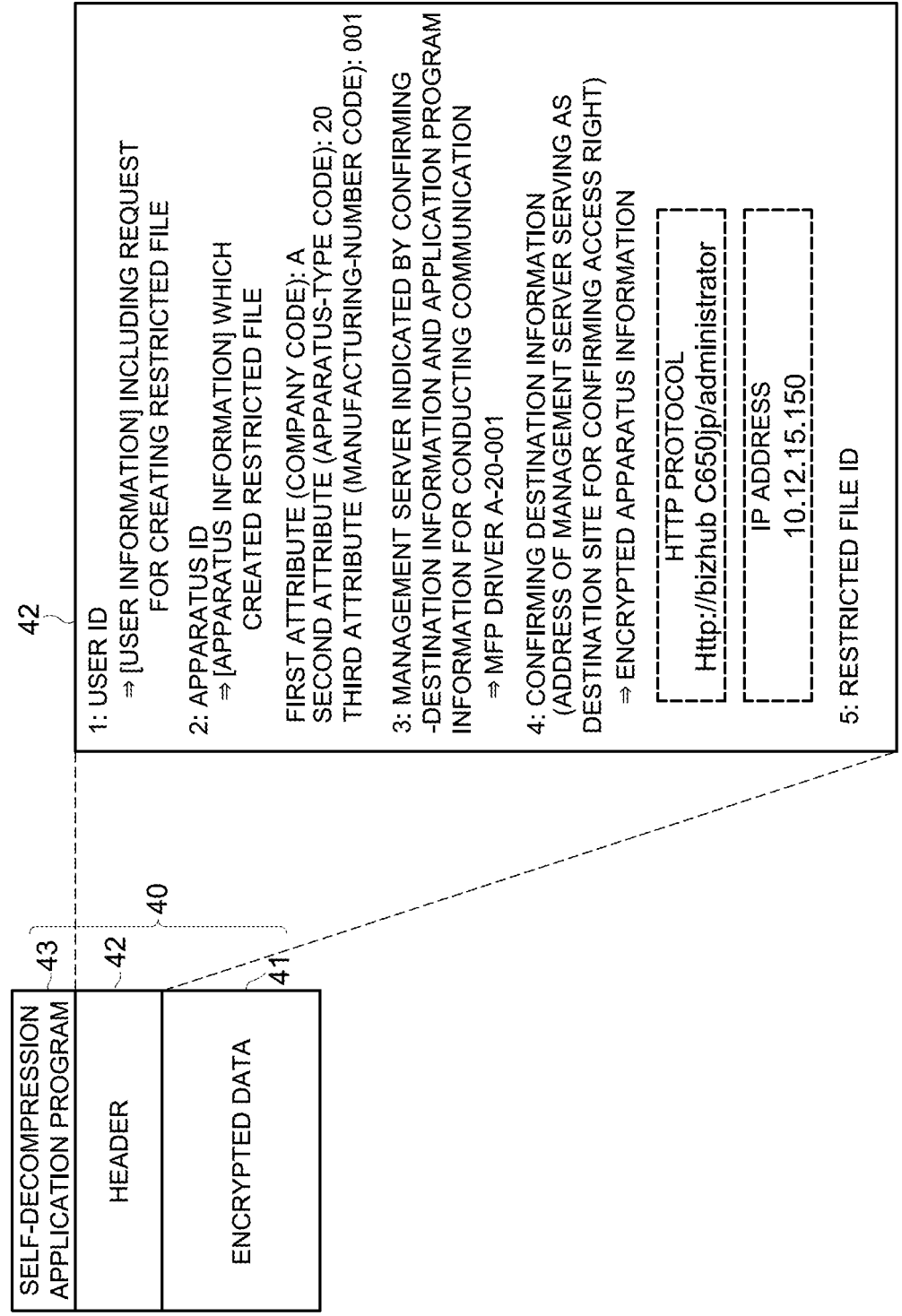
FIG. 4 shows an explanatory schematic diagram indicating a detailed data structure of a restricted file, embodied in the present invention.

FIG. 4 shows a schematic diagram indicating a further detailed data structure of the restricted file 40. Registered in the header 42 includes:

(1) the identification information of the user who had requested the image forming apparatus 20 to create the restricted file 40 concerned (user's ID);
(2) the other identification information of the image forming apparatus 20 that created the restricted file 40 concerned (apparatus ID);
(3) the information in regard to the application program for communicating with the management server indicated by the confirming destination information (application program information);
(4) the confirming destination information of the access right in regard to the restricted file 40 concerned; and
(5) restricted file ID.

The apparatus ID is constituted by a first attribute indicating a company code, a second attribute indicating a model code and a third attribute indicating a product code. For instance, the apparatus ID of "A-20-001" includes the first attribute of "A", the second attribute of "20" and the third attribute of "001". However, the scope of the data structure of the apparatus ID is not limited to the above.

Further, in the present embodiment, the application program information is defined as such information that indicates the MPF driver corresponding to the image forming apparatus 20, which created the restricted file 40 concerned. Still further, the confirming destination information is defined as network address information of the image forming apparatus 20, which created the restricted file 40 concerned. For instance, the URL or the IP address in conformity with the HTTP (Hyper Text Transfer Protocol) is registered as the confirming destination information.

Yet further, the restricted file ID is such an identification information that is given to the restricted file 40 concerned, by the image forming apparatus 20.

The processing to be performed by executing the self-decompressed application program acquired by self-decompressing the self-decompression application program 43 includes:

(1) parsing the header 42 of the restricted file 40;
(2) checking whether or not the application program (MFP driver), indicated by the application program information included in the header 42 of the terminal device 10 in which the self-decompressing operation has been implemented, exists within the header 42 concerned, by using the registry or the like;
(3) when determining that the application program (MFP driver), indicated by the application program information included in the header 42 of the terminal device 10 in which the self-decompressing operation has been implemented, does not exist within the header 42 concerned, acquiring and installing the application program concerned; and
(4) activating the application program (MFP driver) indicated by the application program information included in the header 42 concerned.

In this connection, the activated application program conducts such the processing that include:

(1) requesting the management server, indicated by the confirming destination information (address information) included in the header 42, to confirm the access right;
(2) when the presence of the access right is confirmed, receiving the key of cryptograph from the image forming apparatus 20 so as to create a copy of the encrypted data 41 by using the key of cryptograph, and then, decrypting the above-created copy of the encrypted data 41 so as to generate decrypted data, and after that, deleting the key of cryptograph;
(3) monitoring the operations performed with respect to the above-decrypted data, and when a certain operation is requested to perform, confirming the access right for the concerned operation with the management server;
(4) when the concerned operation continues for a long time, periodically confirming the access right of the concerned operation with the management server for every time when a predetermined time has elapsed; and
(5) when the access right is not confirmed (including in case of communication shutdown), banning operations with respect to the encryption processing and the decrypted data, and deleting the decrypted data.

Figure 5:
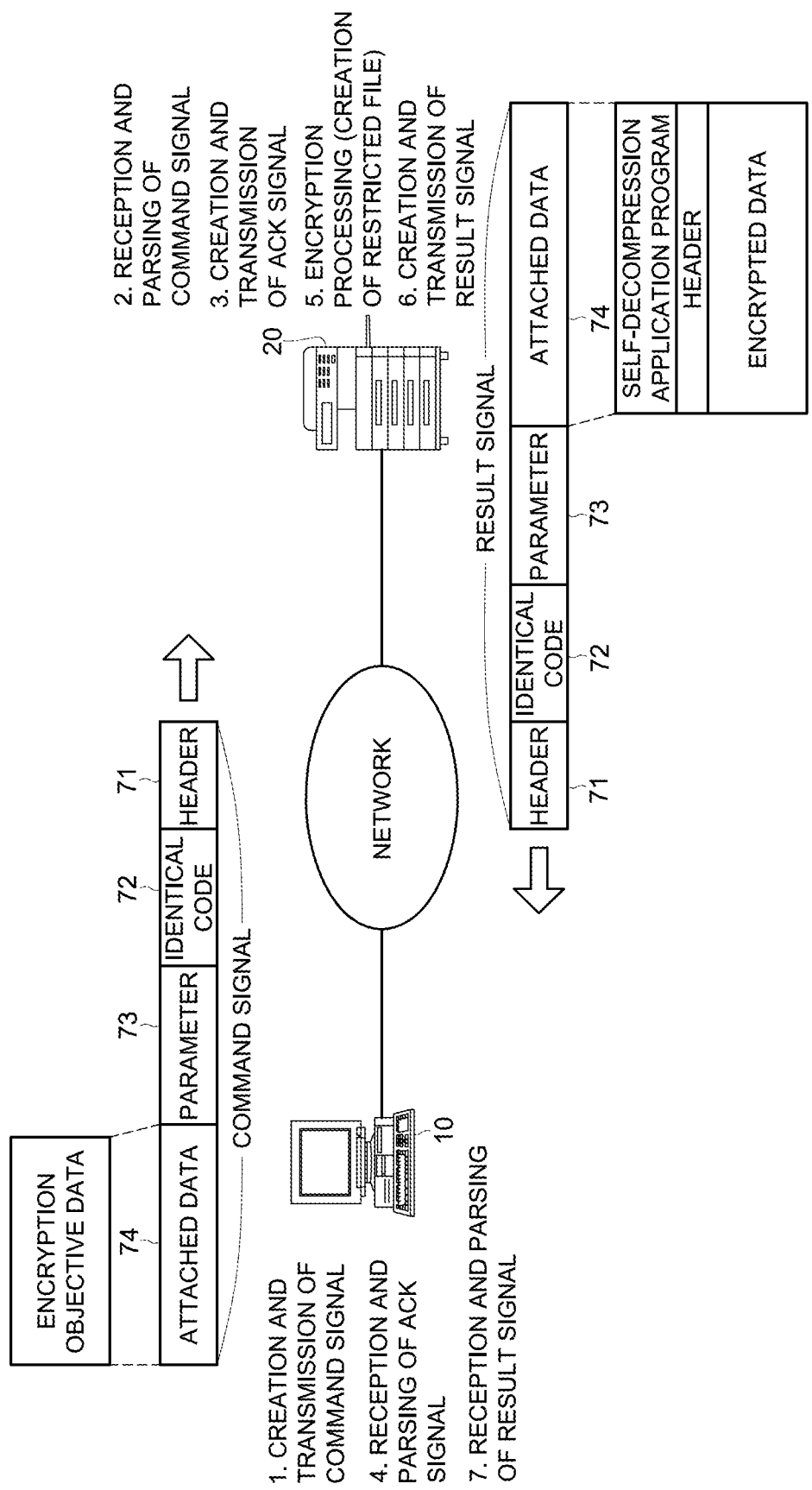
FIG. 5 shows an explanatory schematic diagram indicating data structures of various kinds of signals, which are communicated with each other between a terminal device and an image forming apparatus.

FIG. 5 shows a schematic diagram indicating data structures of a command signal, etc., which are communicated with each other by the terminal device 10 and the image forming apparatus 20. The command signal is constituted by a header 71, an identical code 72, parameters 73 and attached data 74. The terminal device 10 transmits the command signal to the image forming apparatus 20, while the image forming apparatus 20 transmits a result signal, which represents results of processing in regard to the command signal, to the terminal device 10. The data structure of the result signal is similar to that of the command signal. The transmission objective data, such as the encrypting objective data, the restricted file 40, the key of cryptograph, etc., are transmitted in such a state that those are embedded into an area of the attached data 74.

When the terminal device 10 transmits the command signal for requesting the image forming apparatus 20 to implement processing for encrypting the data, transmitted from the terminal device 10, so as to create the restricted file 40, the communication sequence to be conducted between the terminal device 10 and the image forming apparatus 20 includes the operations indicated as follow.

(1) The terminal device 10 creates the command signal including the encrypting objective data, and transmits the created command signal to the image forming apparatus 20.

(2) The image forming apparatus 20 receives and parses the concerned command signal.
(3) The image forming apparatus 20 creates an Ack signal in regard to the concerned command signal so as to transmit the Ack signal to the terminal device 10.
(4) The terminal device 10 receives and parses the Ack signal.
(5) The image forming apparatus 20 conducts the processing in regard to the command signal (herein, the processing for creating the restricted file 40).
(6) The image forming apparatus 20 creates the result signal including the restricted file 40 of the processing result and transmits the created result signal to the terminal device 10.
(7) The terminal device 10 receives and parses the result signal.

In this connection, the Ack signal is defined as such a signal that is to be sent from the image forming apparatus 20 to the terminal device 10 so as to notify the terminal device 10 of the fact that the image forming apparatus 20 has received the command signal.

FIG. 6 shows a table indicating detailed contents of the information to be stored in each of the storing areas included in each of control signals, such as the command signal, etc. The header 71 represents an attribute (category) of the control signal (packet) concerned. The identical code 72 represents a fine classification within the signal having the attribute (category) represented by the header 71. For instance, the identical code 72 represents a kind of operation. With respect to the Ack signal, the identical code 72 represents that the current Ack signal corresponds to the command signal in regard to which kind of operation. With respect to the Result signal, the identical code 72 represents that the current Result signal corresponds to the command signal in regard to which kind of operation. The parameters 73 represent contents of communication results (such as a normal status, a kind of error, etc.) in the Result signal. Various kinds of data serving as communication objective data, such as encryption objective data, restricted file 40, a key of cryptograph, an application program, etc., are to be stored in an area of the attached data 74.

Next, the operations to be performed for creating the restricted file 40 will be detailed in the following.

The operations to be performed for creating the restricted file 40 includes Case 1 in which the data stored in the box, etc., of the image forming apparatus 20, is encrypted so as to create the restricted file 40, and the above-created restricted file 40 is outputted to the terminal device 10, or Case 2 in which the terminal device 10 transmits the encryption objective data to the image forming apparatus 20, and the image forming apparatus 20 encrypts the received data so as to create the restricted file 40, and then, the image forming apparatus 20 sends the above-created restricted file 40 back to the terminal device 10. Each of Case 1 and Case 2 will be detailed in the following.

<Case 1>

Based on the request of copy operation (or the request of move operation) sent from the terminal device 10, the image forming apparatus 20 performs such the operations that the data stored in the box, etc., of the image forming apparatus 20, is encrypted so as to create the restricted file 40 including the encrypted data concerned, and the above-created restricted file 40 is outputted to the terminal device 10, serving as the sender of the request. Since the box data is included in the restricted file 40 as the encrypted data, the security of the box data is maintained even if it is brought into the external environment.

Figure 7:
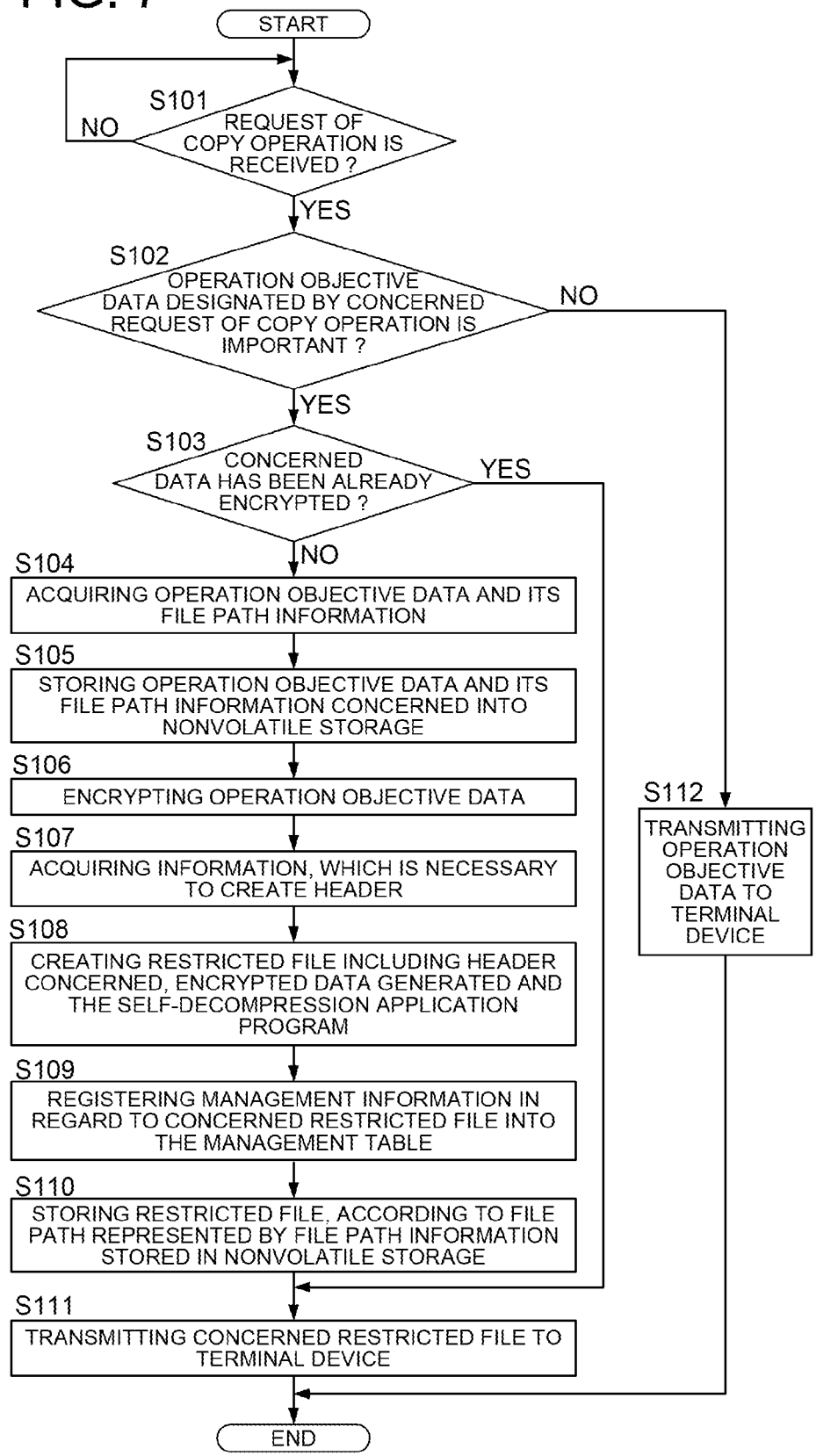
FIG. 7 shows a flowchart indicating an operational flow to be conducted in an image forming apparatus, when a restricted file is created in response to a request of copy operation sent from a terminal device.

FIG. 7 shows a flowchart indicating an operational flow to be conducted in the image forming apparatus 20 when the restricted file 40 is created in response to the request of copy operation sent from the terminal device 10. Receiving the instruction for implementing the copy operation after accepting the designation of the copy-operation objective data by using the box name, the file name, etc., inputted by the user through the MFP driver 63, the terminal device 10 transmits the request of copy operation including the contents of the concerned designation to the image forming apparatus 20. The request of copy operation also includes the user ID of the user who has instructed this request concerned. When receiving the request of copy operation sent from the terminal device 10 (Step S101; Yes), the image forming apparatus 20 whether or not the operation objective data designated by the concerned request of copy operation is important (Step S102). In this connection, the information representing the importance or unimportance of the data is registered in advance in the header of the data concerned, or as the management information. Further, the system is so constituted that the information representing the importance or unimportance of the data can be arbitrarily registered by the user who owns the box, or who has entered the data into the box concerned.

Successively, when determining that the operation objective data is not important (Step S102; No), the CPU 21 of the image forming apparatus 20 reads out the concerned data from the box, so as to transmits the above-readout data to the terminal device 10, serving as a requester of the concerned copy operation, (Step S112) and finalizes the processing (END).

Still successively, when determining that the operation objective data is important (Step S102; Yes), the CPU 21 of the image forming apparatus 20 further determines whether or not the concerned data has been already encrypted (has been converted to the restricted file 40) (Step S103). When determining that the concerned data has been already encrypted (Step S103; Yes), the CPU 21 transmits the restricted file 40 including the above-encrypted data to the terminal device 10, serving as a requester of the concerned copy operation, (Step S111) and finalizes the processing (END).

When determining that the concerned data has not been encrypted (Step S103; No), the CPU 21 of the image forming apparatus 20 acquires the operation objective data and its file path information (Step S104), so as to store the operation objective data and its file path information concerned into the nonvolatile storage 26 (Step S105), and then, encrypts the operation objective data (Step S106).

Successively, the CPU 21 collects and acquires the information, which is necessary to create the header 42 of the restricted file 40 (Step S107). For instance, the user ID included in the request of copy operation is also employed as a user ID to be included in the header 42. Other than the user ID, the CPU 21 acquires various kinds of information, including an apparatus ID, application program information (such as the name of the MFP driver, the version information, etc.) and confirming destination information (such as, the address information including its IP address, the URL), by reading out them from the nonvolatile storage 26 of its own.

Still successively, based on the information collected and acquired in the above, the CPU 21 generates the header 42, so as to create the restricted file 40 including the header 42 concerned, the encrypted data 41 generated in Step S106 and the self-decompression application program 43 predetermined (Step S108). In this connection, since the self-decompression application program 43 is stored in advance in the HDD 25 or the ROM 23, the system if so constituted that the self-decompression application program 43 is included into the restricted file 40 by copying it from the HDD 25 or the ROM 23 to the restricted file 40.

Figure 8:
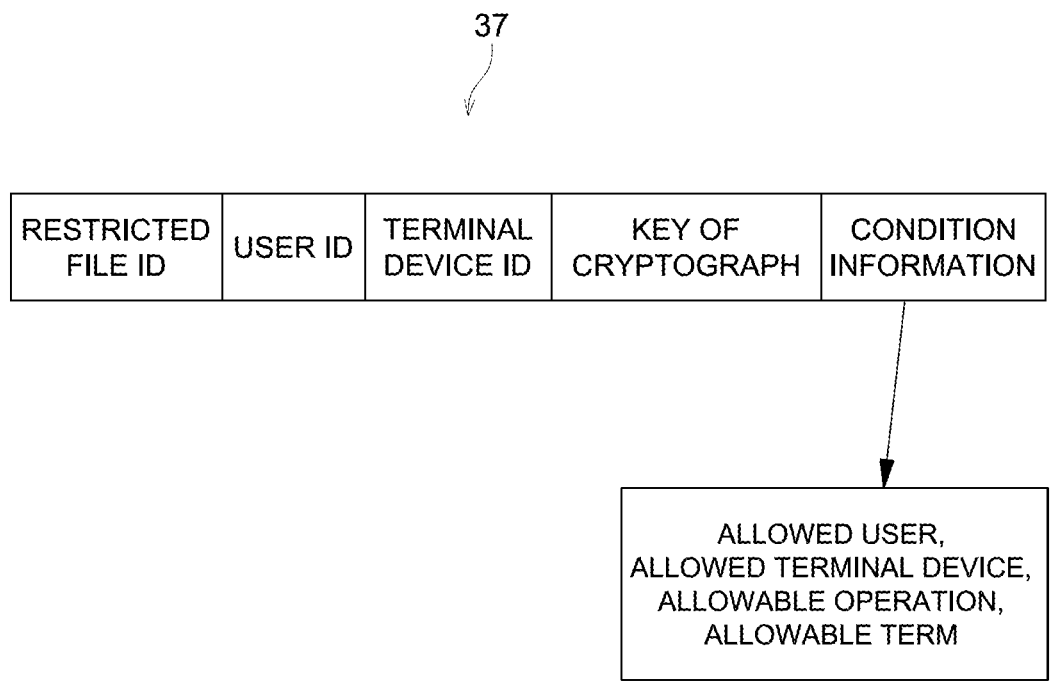
FIG. 8 shows an explanatory schematic diagram indicating a data structure of a management table, embodied in the present invention.

Yet successively, the CPU 21 of the image forming apparatus 20 registers the management information in regard to the restricted file 40 created in the above, into the management table 37 (Step S109). As shown in FIG. 8, the user ID and the apparatus ID being same as those registered into the header 42 of the restricted file 40, the key of cryptograph for the encrypted data 41 included in the restricted file 40 and the condition information to be used for confirming the access right, are registered into the management information, while correlating them with the restricted file ID serving as the identification information for specifying the restricted file 40 concerned.

The condition information includes various kinds of information, such as identification information (user ID) for specifying the user whose access right is to be allowed (allowed user), identification information (terminal device ID) for specifying the information processing apparatus or the terminal device, an access right of which is to be allowed (allowed terminal device), identification information (name of operation or operation ID) for specifying the operation, an accessing operation of which is to be allowed (allowed operation), a term of allowing the accessing operation (allowed term), etc. It is applicable that the allowed user, the allowed terminal device, the allowed term, etc, are established for every one of the allowed operations. Further, it is also applicable that the allowed term is designated by an absolute date, such as a combination of year, month, day and time, etc., or designated by, for instance, a relative term elapsing from a certain original time-point, such as 3 days from the initial accessing operation, etc.

Returning to the flowchart shown in FIG. 7 to continue the explanation of the processing procedure, the CPU 21 of the image forming apparatus 20 stores the restricted file 40 created in Step S108 according to the file path represented by the file path information stored in the nonvolatile storage 26 in Step S105 (Step S110), and then, transmits the concerned restricted file 40 to the terminal device 10, serving as a requester of the concerned copy operation, (Step S111) and finalizes the processing (END).

Figure 9:
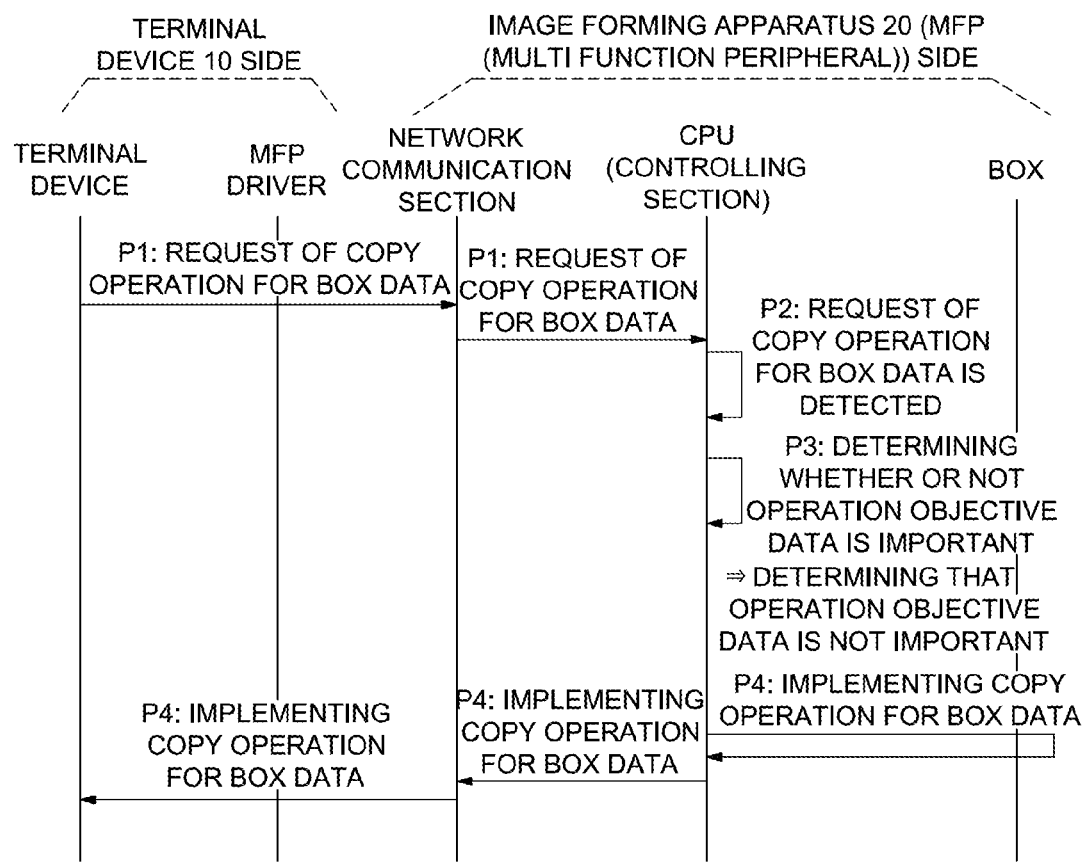
FIG. 9 shows a sequential operation chart in regard to operations indicated in the flowchart shown in FIG. 7, when Step S102 is determined as No.
Figure 10:
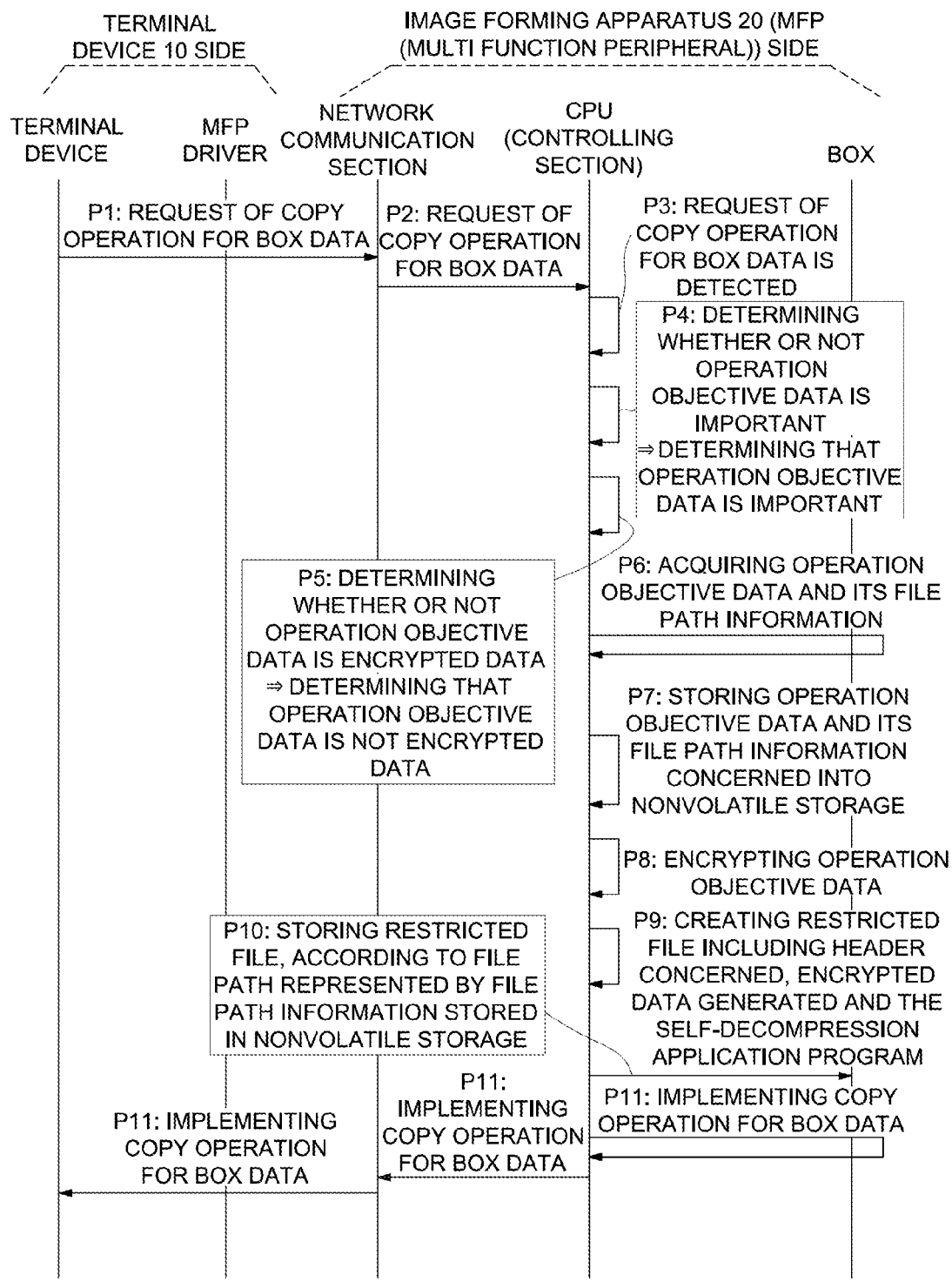
FIG. 10 shows a sequential operation chart in regard to operations indicated in the flowchart shown in FIG. 7, when Step S103 is determined as No.
Figure 11:
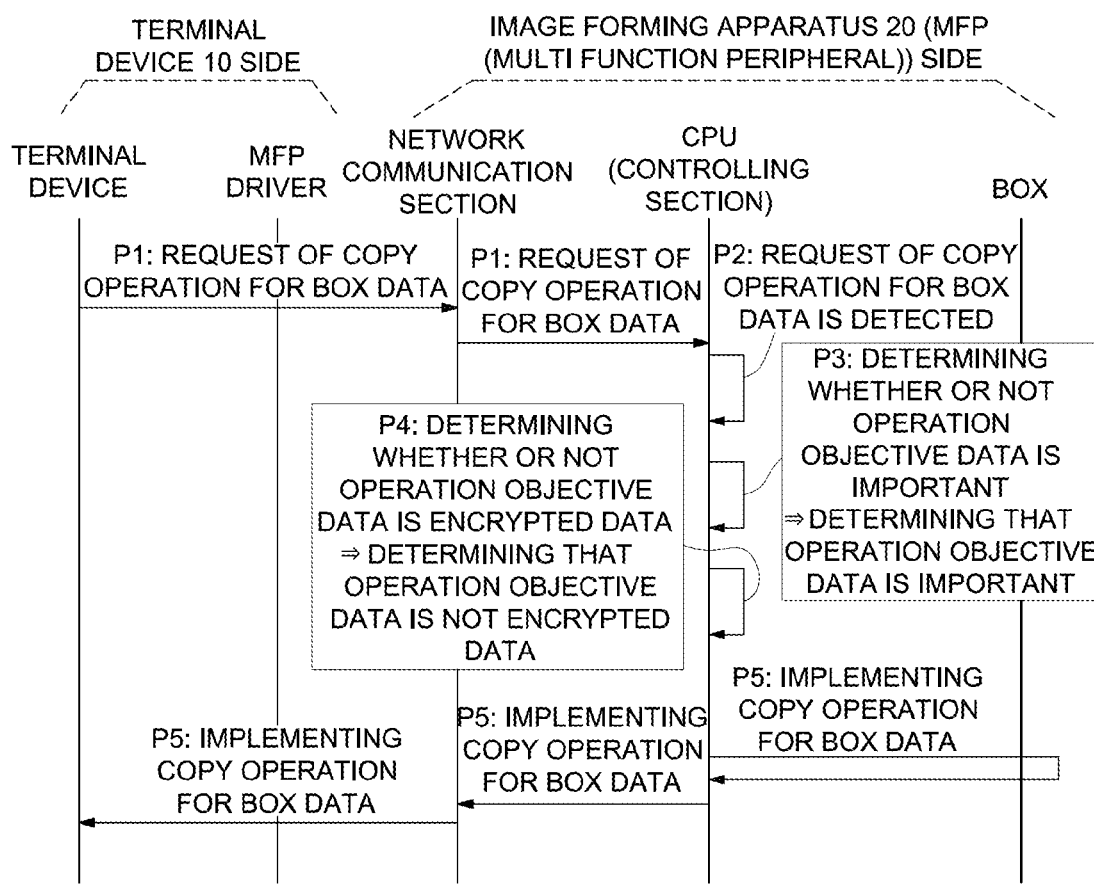
FIG. 11 shows a sequential operation chart in regard to operations indicated in the flowchart shown in FIG. 7, when Step S103 is determined as Yes.

FIG. 9, FIG. 10 and FIG. 11 show sequential operation charts in regard to the operations indicated in the flowchart shown in FIG. 7. Concretely speaking, FIG. 9 shows a sequential operation chart to be conducted when determining that the operation objective data is not important (Step S102 shown in FIG. 7; No). FIG. 10 shows another sequential operation chart to be conducted when determining that the operation objective data is important (Step S102; Yes) and the concerned data has not been encrypted (Step S103 shown in FIG. 7; No). FIG. 11 shows still another sequential operation chart to be conducted when determining that the operation objective data is important (Step S102; Yes) and the concerned data has been encrypted (Step S103; Yes).

In this connection, operations and a sequence to be conducted at the time when the concerned data is moved from the box to the terminal device 10 are similar to those to be conducted at the time when the request of implementing the copy operation is received.

<Case 2>

In Case 2, the image forming apparatus 20 and the terminal device 10 perform such the operations that the terminal device 10 transmits the encryption objective data to the image forming apparatus 20, and the image forming apparatus 20 encrypts the received data so as to create the restricted file 40, and then, the image forming apparatus 20 sends the above-created restricted file 40 back to the terminal device 10. In Case 2, the MFP driver is automatically booted up when the user inputs the instruction with respect to the printing operation by using the application programs 62 installed in the terminal device 10, so as to make it possible for the user to input various kinds of settings and implementation instructions in regard to the encrypting operation from the operation inputting screen provided by the MFP driver concerned.

Figure 12A:
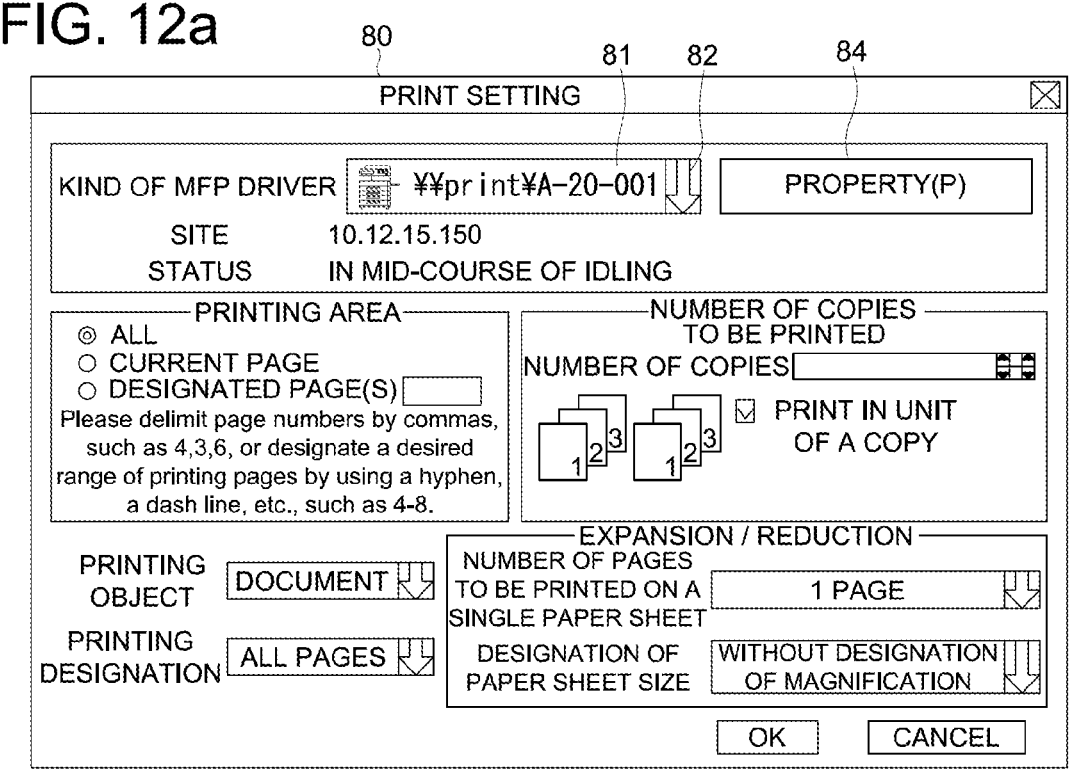
FIG. 12a shows a schematic diagram indicating a print setting screen, displayed by a display device of a MFP driver under controlling operations conducted by a CPU of a terminal device.

FIG. 12*a* shows a schematic diagram indicating a print setting screen 80 of the MFP driver, displayed by the display device 57 under the controlling operations conducted by the CPU 51 of the terminal device 10. In this connection, herein, if plural kinds of MFP drivers are installed in advance in the terminal device 10 concerned, a default MFP driver is initially indicated within a driver designation area 81. If the user wishes to employ a specific image forming apparatus 20, other than the image forming apparatus 20 that corresponds to the default MFP driver, for implementing the encryption processing (the operation for creating the restricted file 40), the MFP driver list 83, indicating the MFP drivers installed in advance, is displayed from the driver designation area 81 by depressing the pull-down button 82, so that the user can select a desired MFP driver from the MFP driver list 83 so as to change the default MFP driver to the other MFP driver corresponding to the specific image forming apparatus 20.

Figure 13A:
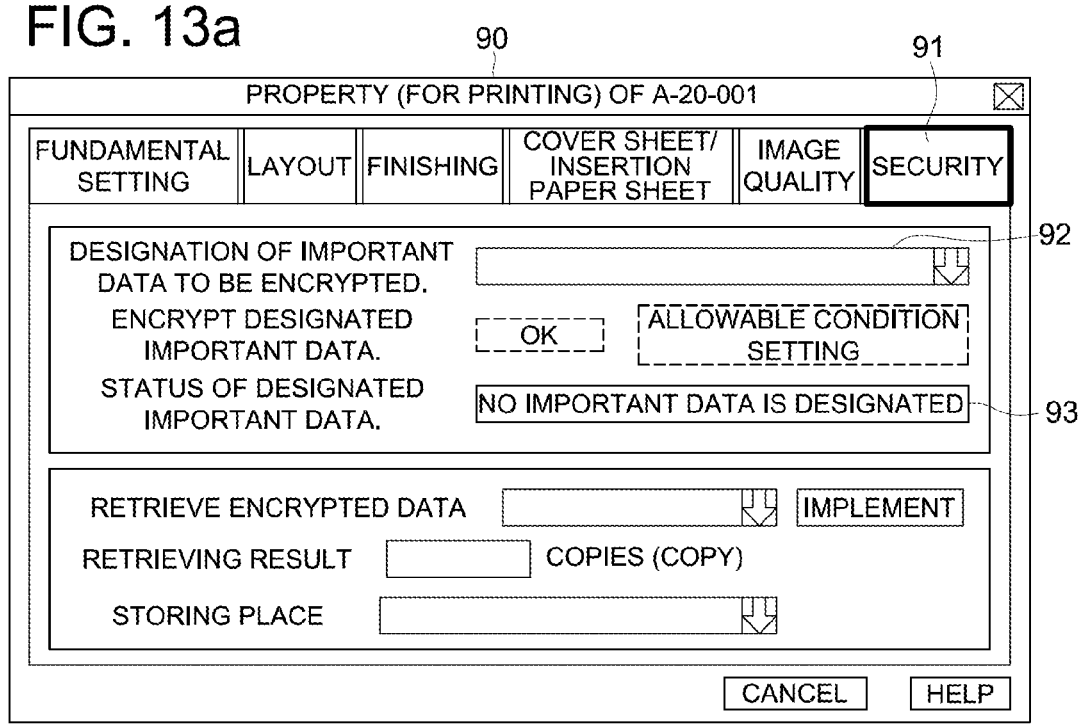
FIG. 13a shows a schematic diagram indicating a property screen of a MFP driver, when important data is not designated.

Successively, the user conducts an operation for designating the encryption objective data. When a property button 84 is depressed, the CPU 51 makes the display device 57 display a property screen 90 shown in FIG. 13*a*. The property screen 90 is provided with tubs corresponding to various kinds of setting items, and a security tub 91 is currently selected in the property screen 90 shown in FIG. 13*a*. Accordingly, by using the current screen selected by the security tub 91, it is possible for the user to input various kinds of user's operations, such as an operation for designating the encryption objective data, an operation for establishing the allowable conditions (conditional information), an operation for instructing the implementation of the encrypting operation, etc.

The file path and the file name are inputted into the objective data designation area 92. While, status information in regard to the encryption objective data concerned is displayed in a status display area 93.

When the operation for designating the encryption objective data is completed, the message displayed in the status display area 93 changes from "UNDESIGNATED" to "DESIGNATED". Further, the statuses of an OK button 94 and an allowable condition setting button 95 are changed from the operation unacceptable status to the operation acceptable status. In this connection, the status messages to be displayed within the status display area 93 include "DATA IS UNDESIGNATED" "DATA IS DESIGNATED" "TRANSMITTING DATA" "ENCRYPTING DATA" "RECEIVING RESTRICTED FILE" "RESTRICTED FILE IS STORED" etc.

Figure 14:
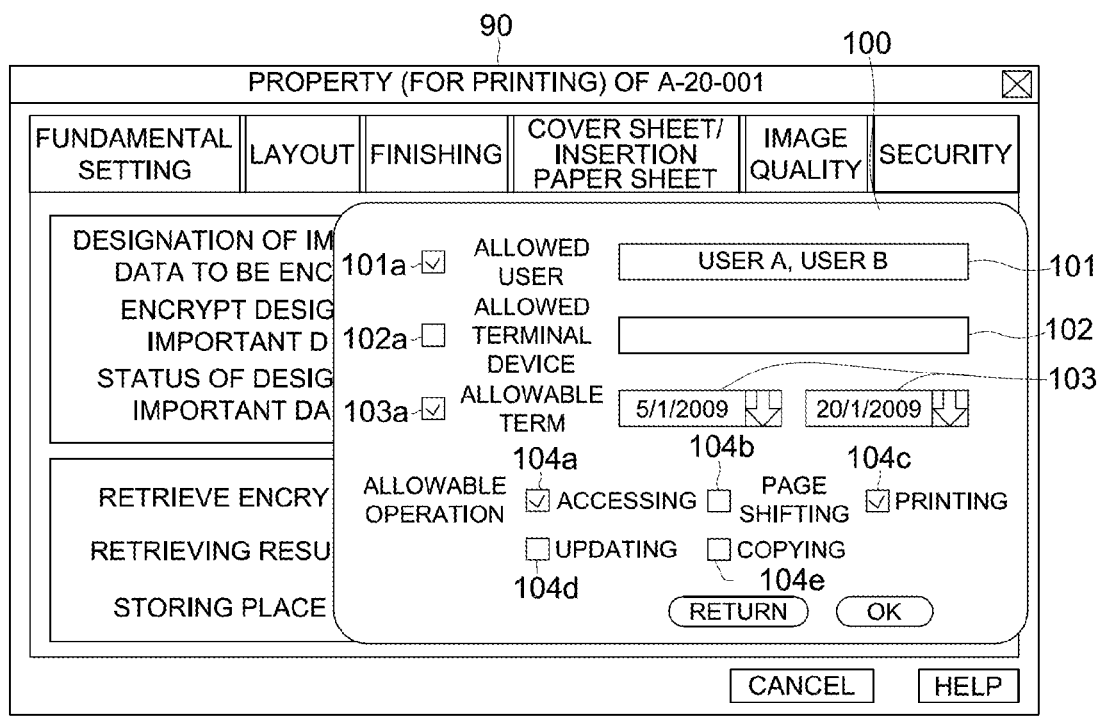
FIG. 14 shows a schematic diagram indicating an operation allowable-condition setting screen while overlapping a property screen of a MFP driver.

When the allowable condition setting button 95 is depressed, as shown in FIG. 14, the CPU 51 makes the display device 57 display an operation allowable-condition setting screen 100 in a popup display mode. The operation allowable-condition setting screen 100 is provided with an allowable user setting area 101 for establishing a user ID of the allowable user, an allowable terminal-device setting area 102 for establishing a terminal device ID of the allowable terminal device, an allowable term setting area 103 for establishing the allowable term and checkboxes 104*a*-104*e*, each of which corresponds to each of the allowability setting operations. Further, the operation allowable-condition setting screen 100 is also provided with checkboxes 101*a*-103*a*, each of which corresponds to each of the allowable conditions including the allowable user, the allowable terminal device and the allowable term.

When a checkmark is inputted into any one of the checkboxes 101a-103a, which respectively correspond to the allowable user, the allowable terminal device and the allowable term, the allowable condition attached with the checkmark is established as the condition for confirming the access right, while the allowable condition without the checkmark is ignored. Further, the operation attached with the checkmark inputted into any one of the checkboxes 104a-104e is regarded as the allowance objective operation, while the other operation without the checkmark is not allowed even if the allowable conditions, such as the allowable user, etc., coincide with each other.

For instance in the operation allowable-condition setting screen 100 shown in FIG. 14, since the checkmark is only inputted into the checkbox 104a of "ACCESSING" and the checkbox 104e of "PRINTING" as the , while no checkmark is inputted into the checkbox 102a of "ALLOWABLE TERMINAL DEVICE", but the checkmark is inputted into the checkbox 101a of "ALLOWABLE USER" and the checkbox 103a of "ALLOWABLE TERM", the conditions are established as "any arbitral one of the terminal devices may be employed as the terminal device 10 to be operated, and the accessing operation (page shifting operation is banned) and the printing operation is allowed only to the user established in the allowable user setting area 101 within the allowable operation term established in the allowable term setting area 103". In this connection, it is applicable that the system is so constituted that the conditions, such as the allowable user, the allowable terminal device, the allowable term, etc., are settable for every one of the allowability setting operations. Further, the scope of the allowable conditions and the allowability setting operations is not limited to the above-exemplified embodiment, and the scope of them may be established as needed.

Figure 12B:
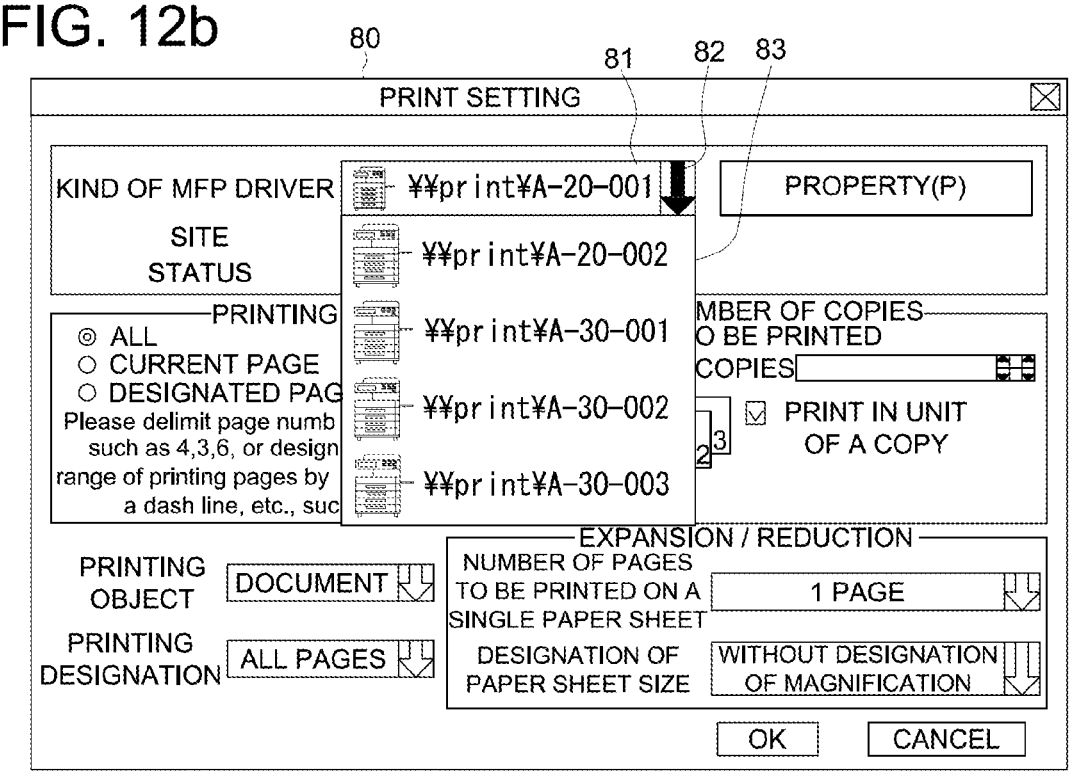
FIG. 12b shows a schematic diagram indicating a print setting screen, displayed by a display device of a MFP driver under controlling operations conducted by a CPU of a terminal device, when a pull-down screen indicating various kinds of MFP drivers is displayed thereon.
Figure 15:
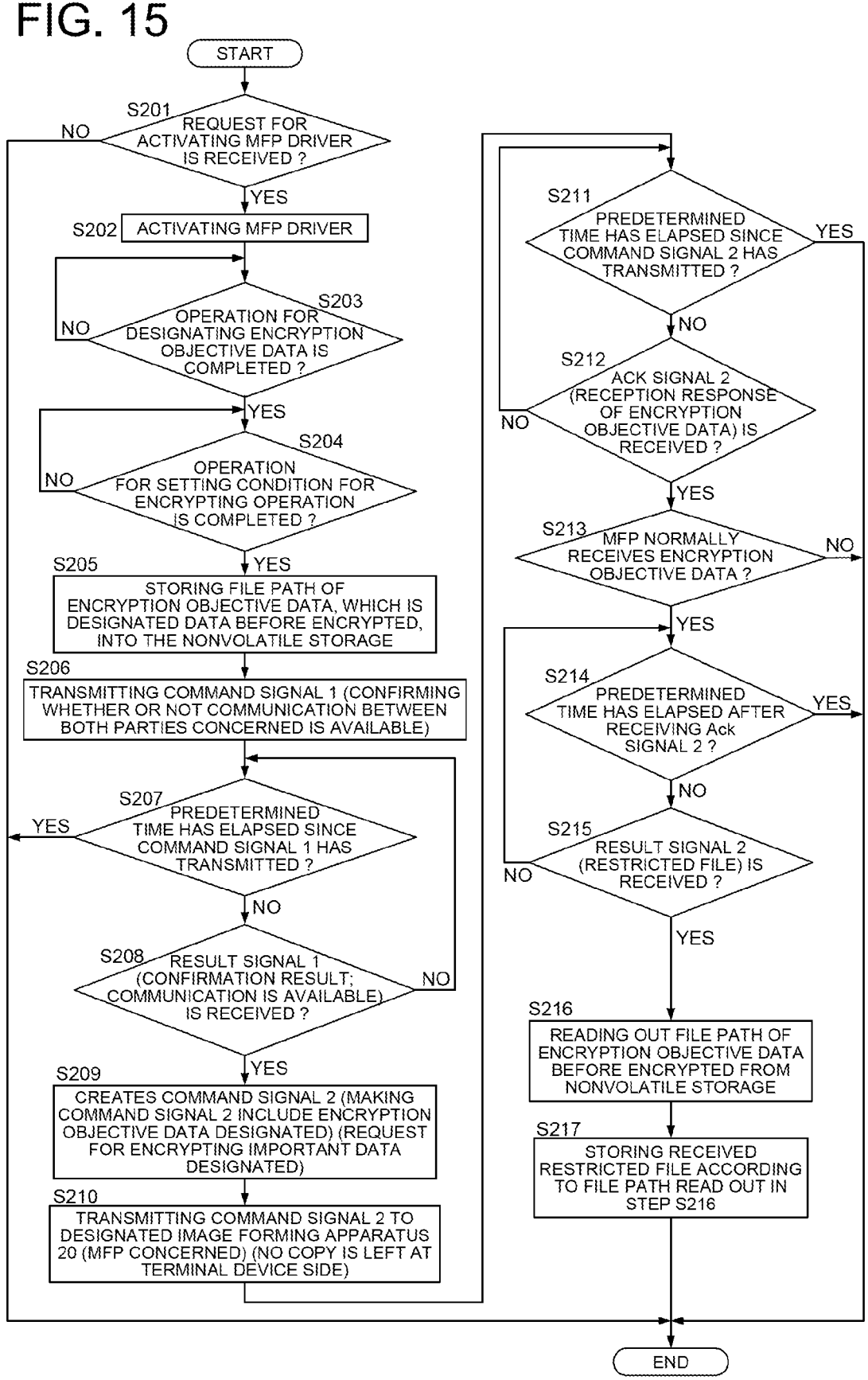
FIG. 15 shows a flowchart indicating an operational flow to be conducted by a terminal device in an encryption processing of Case 2.
Figure 16:
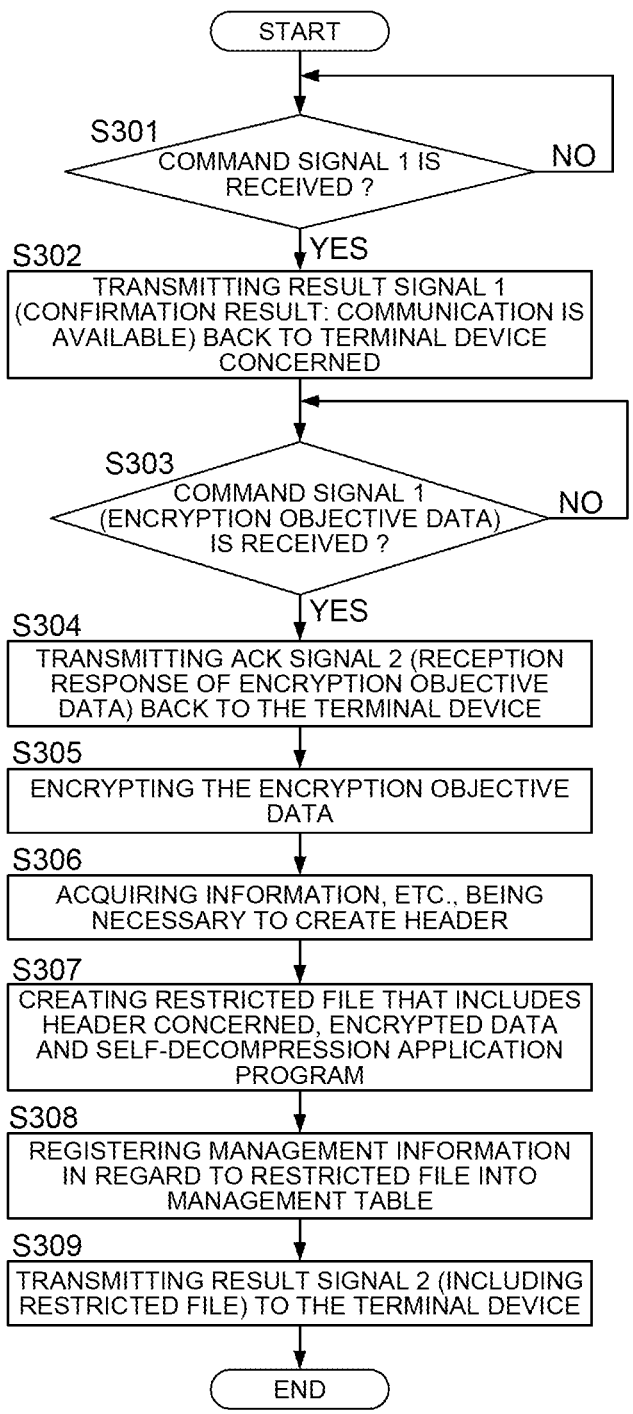
FIG. 16 shows a flowchart indicating an operational flow to be conducted by an image forming apparatus in an encryption processing of Case 2.

FIG. 15 shows a flowchart indicating an operational flow to be conducted by the terminal device 10 in Case 2, and FIG. 16 shows another flowchart indicating another operational flow to be conducted by the image forming apparatus 20 in Case 2. Receiving the request for activating the MFP driver (Step S201; Yes), the CPU 51 of the terminal device 10 activates the MFP driver designated by the driver designation area 81 of the print setting screen 80 shown in FIG. 12a and FIG. 12b (Step S202), and receives the operation for designating the encryption objective data to be inputted into the objective data designation area 92 of the property screen 90 shown in FIG. 13 (Step S203). Successively, receiving the operation for depressing the allowable condition setting button 95, the CPU 51 makes the display device 57 display the operation allowable-condition setting screen 100 in the popup mode, so as to accept the operation for setting the condition for confirming the access right in regard to the encrypting operation and the encrypted data concerned (Step S204).

Figure 13B:
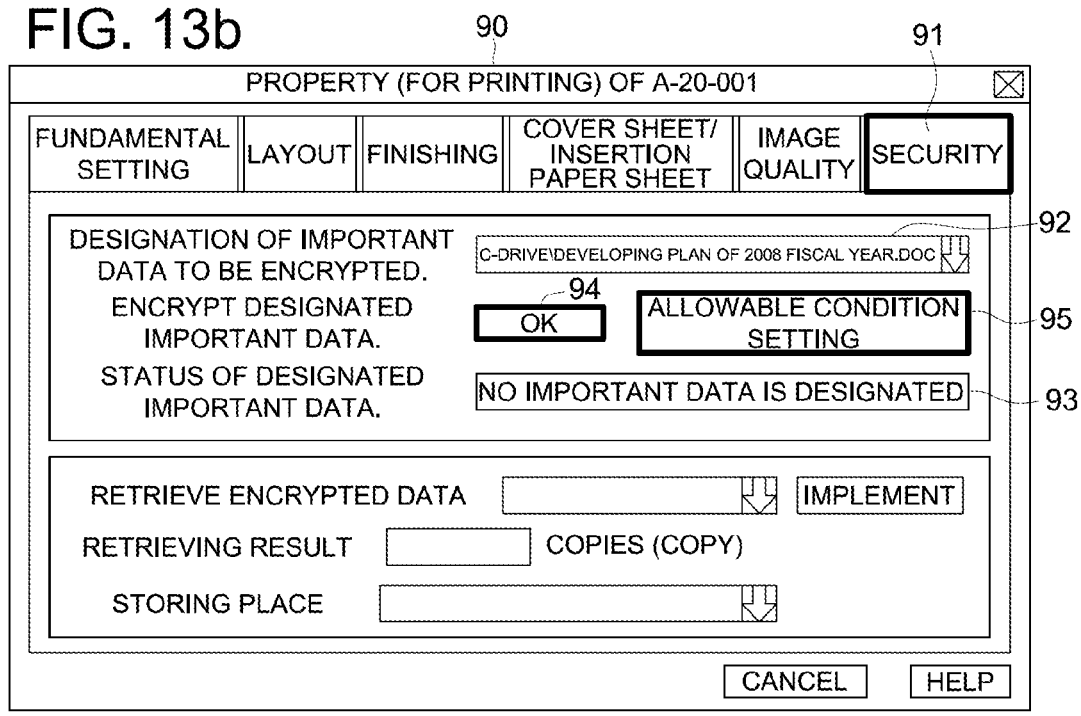
FIG. 13b shows a schematic diagram indicating another property screen of a MFP driver, when important data is already designated.

Still successively, receiving the operation for depressing the OK button 94 from the property screen 90 shown in FIG. 13, the CPU 51 implements a processing for encrypting the encryption objective data so as to create the restricted file 40. Concretely speaking, the CPU 51 of the terminal device 10 stores the file path of the encryption objective data, which is designated data before encrypted, into the nonvolatile storage 59 (Step S205), and then, transmits Command signal 1 to the image forming apparatus 20 corresponding to the specific MFP driver designated by the driver designation area 81 (hereinafter, referred to as the designated MFP) (Step S206). Command signal 1 is employed as such a command signal that confirms an availability of communication between them.

Still successively, receiving Command signal 1 (Step S301 shown in FIG. 16; Yes), the image forming apparatus 20 creates Result signal 1 that indicates the fact that the image forming apparatus 20 concerned has received Command signal 1, and transmits Result signal 1 to the terminal device 10 serving as the sender of Command signal 1 concerned (Step S302).

When the terminal device 10 cannot receive Result signal 1 even after a predetermined time has elapsed since Command signal 1 transmitted to the image forming apparatus 20 (Step S207 shown in FIG. 15; Yes), the terminal device 10 determines the current status as error and finalizes the concerned processing (END). When the terminal device 10 receives Result signal 1 before a predetermined time has elapsed since Command signal 1 transmitted to the image forming apparatus 20 (Step S207; No, and Step S208; Yes), the terminal device 10 creates Command signal 2, serving as a encryption request, (Step S209), and transmits Command signal 2 to the designated MFP (Step S210). Command signal 2 includes the encryption objective data, various kinds of conditions established through the operation allowable-condition setting screen 100, the terminal device ID of the terminal device 10 concerned, the user ID of the user who instructed the encrypting operation, etc.

Still successively, receiving Command signal 2 (Step S303 shown in FIG. 16; Yes), the image forming apparatus 20 (designated MFP) transmit Ack signal 2 corresponding to Command signal 2 to the terminal device 10 serving as the sender of Command signal 2 (Step S304). Further, the image forming apparatus 20 encrypts the encryption objective data included in Command signal 2 (Step S305), and collects and acquires the information being necessary to create the header 42 of the restricted file 40 (Step S306). In the present embodiment, the user ID included in Command signal 2 is also employed for that to be included in the header 42. Further, other information items of its own, such as the apparatus ID, the application program information (including name of the MFP driver concerned, version information, etc.), the confirming destination information (for instance, address information including the IP address and the URL) are also employed for those to be included in the header 42. The image forming apparatus 20 acquired the abovementioned information by reading out them from the nonvolatile storage 26. In addition, the image forming apparatus 20 concerned also creates a new restricted file ID.

Based on the information collected and acquired in the above, the CPU 21 of the designated MFP creates the header 42, so as to creates the restricted file 40 that includes the header 42 concerned, the encrypted data 41 acquired by encrypting the encryption objective data in Step S305 and the self-decompression application program 43 (Step S307). In this connection, since the self-decompression application program 43 is stored in advance in the ROM 23, a copy of the self-decompression application program 43 is to be included in the restricted file 40 concerned.

Still successively, the CPU 21 of the designated MFP registers the management information in regard to the restricted file 40 into the management table 37 (Step S308). An ID symbol (such as a character string, etc.), uniquely allotted to the restricted file 40 concerned by the CPU 21, is employed as the restricted file ID to be registered into the management table 37. Further, the CPU 21 employs the user ID and the condition information that are included in Command signal 2. Still further, the CPU 21 employs its own apparatus ID read from the nonvolatile storage 26 of its own as the apparatus ID concerned. Yet further, the CPU 21 registers the key of cryptograph corresponding to that used at the time when creating the encrypted data 41.

Still successively, the CPU 21 of the designated MFP transmits Result signal 2 including the restricted file 40 created in Step S307 to the terminal device 10, serving as the sender of Command signal 2 (Step S309), and then, finalizes the processing (END).

Still successively, when the terminal device 10 cannot receive Ack signal 2 from the transmitted destination before a predetermined time has elapsed after transmitting Command signal 2 (Step S211 shown in FIG. 15; Yes), or when Ack signal 2, received within the predetermined time interval, represents a reception error (Step S213; No), the CPU 51 of the terminal device 10 finalizes the concerned processing due to the error status (END). When receiving Ack signal 2 representing a normal reception from the transmitted destination before a predetermined time has elapsed after transmitting Command signal 2 (Step S211; No, Step S212; Yes, Step S213; Yes), the CPU 51 of the terminal device 10 still waits the reception of Result signal 2. When the terminal device 10 cannot receive Result signal 2 from the designated MFP before a predetermined time has elapsed after receiving Ack signal 2 (Step S214; Yes), the CPU 51 of the terminal device 10 finalizes the concerned processing due to the error status (END).

Yet successively, after receiving Ack signal 2, when the terminal device 10 receives Result signal 2 from the designated MFP before a predetermined time has elapsed (Step S214; No, Step S215; Yes), the CPU 51 of the terminal device 10 reads out the file path information of the encryption objective data, which is not yet encrypted and was stored in Step S205, from the nonvolatile storage 59 (Step S216) so as to store the received restricted file 40 through the file path represented by the above-read file path information (Step S217), and then, finalizes the concerned processing.

Figure 17:
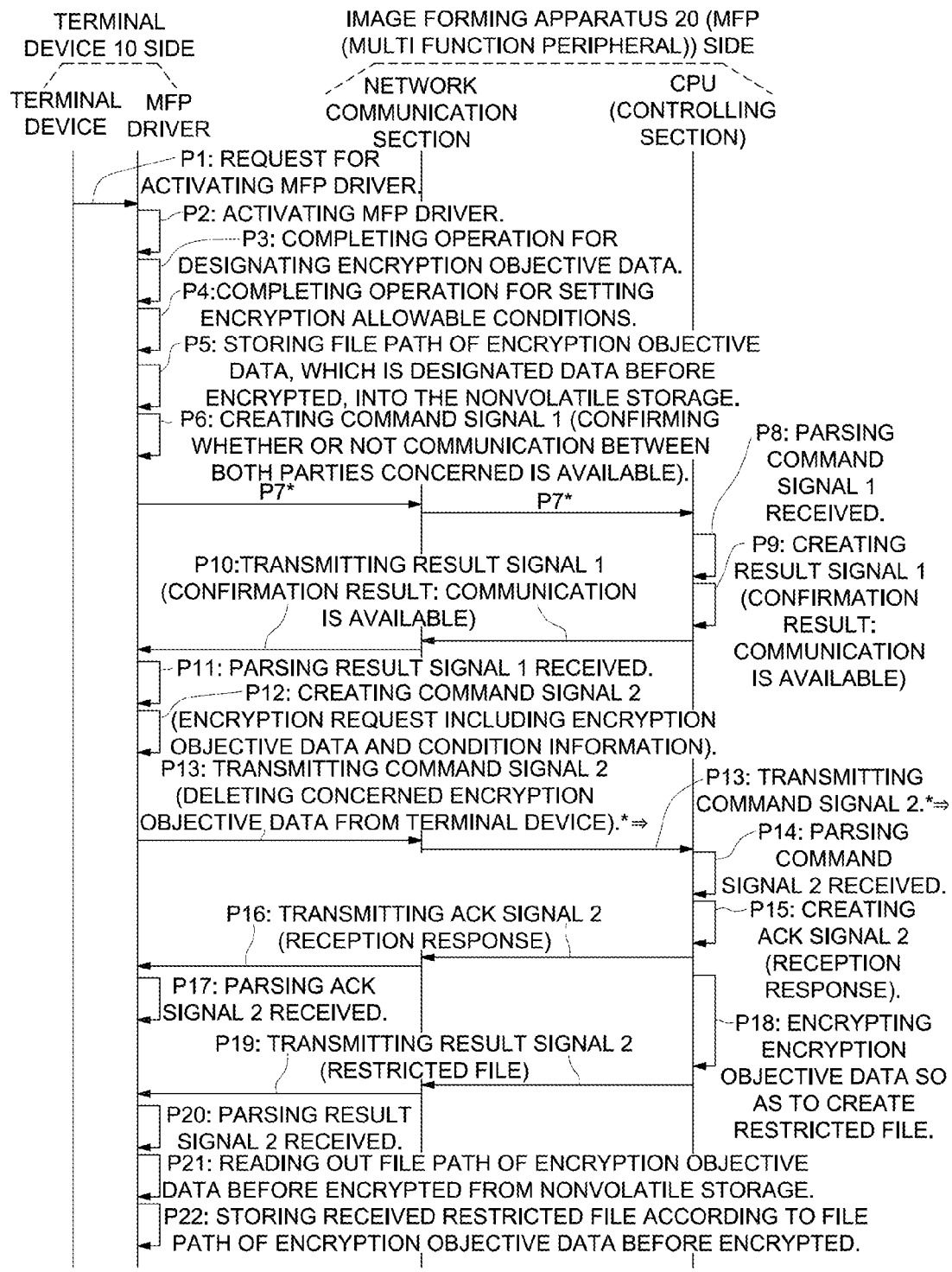
FIG. 17 shows a sequential operation chart in regard to operations indicated in the flowcharts shown in FIG. 15 and FIG. 16.

FIG. 17 shows a sequential operation chart in regard to the operations indicated in the flowcharts shown in FIG. 15 and FIG. 16.

Next, the operation for decrypting the restricted file 40 and the operation for processing the decrypted data will be detailed in the following.

As described referring to the schematic diagram shown in FIG. 1, the restricted file 40, outputted from the image forming apparatus 20 to the terminal device 10, can be stored into the USB storage 6, etc., to carry it to an external environment, so as to use the restricted file 40 on an arbitral external apparatus after confirming the access right.

Figure 18:
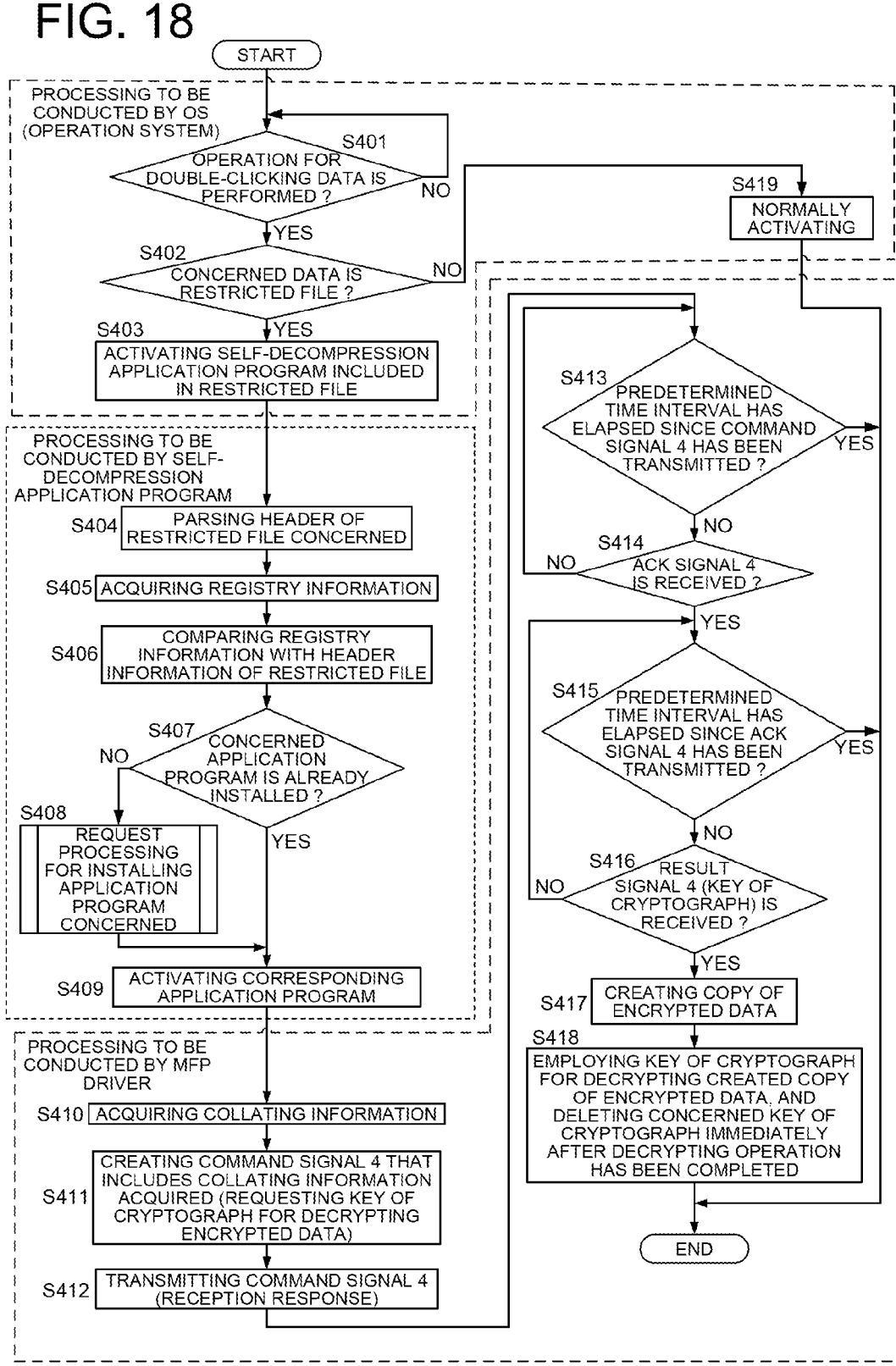
FIG. 18 shows a flowchart indicating a processing flow to be conducted in an information processing apparatus when using a restricted file.
Figure 19:
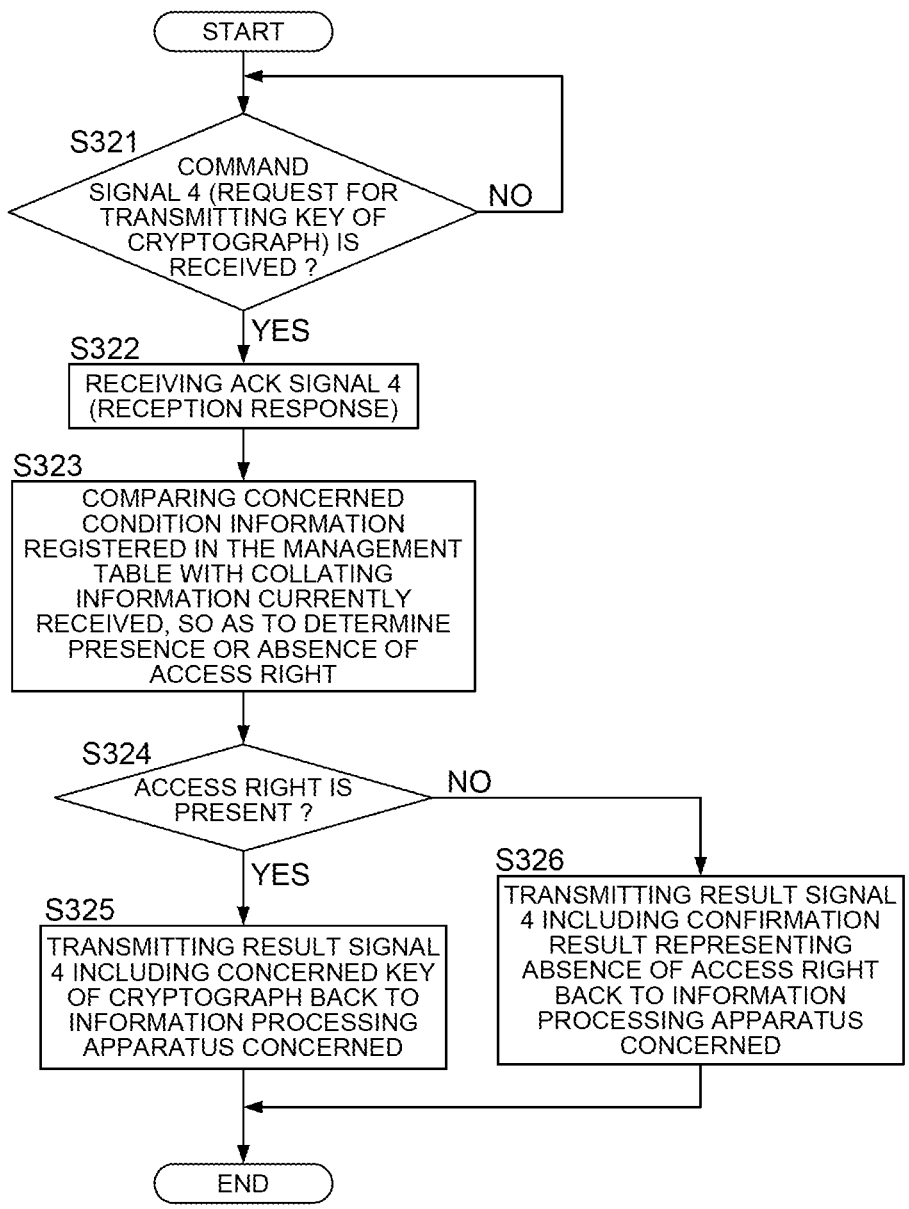
FIG. 19 shows a flowchart indicating another processing flow to be conducted in a management server that has received a request of a key of cryptograph from a terminal device.

With respect to the usage of the restricted file 40, FIG. 18 shows a flowchart indicating a processing flow to be conducted in an arbitral information processing apparatus (for instance, the terminal device 10*b*). Further, FIG. 19 shows another flowchart indicating a processing flow to be conducted in the image forming apparatus 20 serving as the management server. Initially, receiving a double clicking operation for the data (Step S401), the OS program of the information processing apparatus determines a kind of the data concerned so as to activate the application program corresponding to the data concerned. For instance, when determining that the concerned data, to which the double clicking operation is applied, is determined as a normal document file (Step S402; No), the OS program activates the default editing program, etc., so as to open the document file concerned (Step S419).

When determining that the concerned data, to which the double clicking operation is applied, is determined as the restricted file 40 (Step S402; Yes), the OS program of the information processing apparatus activates the self-decompression application program 43 included in the restricted file 40 concerned (Step S403). After that, the self-decompression application program 43, activated by the OS program in the above, is self-decompressed, so that the CPU 51 of the information processing apparatus concerned can executes the self-decompression application program 43 to implement the operations to be conducted in the information processing apparatus concerned. The CPU 51 of the information processing apparatus concerned parses the header 42 of the restricted file 40 by executing the self-decompression application program 43 after the self-decompressing operation is completed (Step S404), and further, acquires the registry information (Step S405). Then, the concerned CPU 51 compares the registry information with the application program information included in the header 42 of the restricted file 40 (Step S406), so as to determine whether or not the application program indicated by the application program information (corresponding application program) is already installed in the information processing apparatus concerned (Step S407).

Successively, when determining that the corresponding application program is not yet installed (Step S407; No), the CPU 51 conducts an installation request processing of the corresponding application program, so as to acquire and install the corresponding application program. The installation request processing will be detailed later on.

Still successively, when determining that the corresponding application program is already installed (Step S407; Yes), or when completing the installation of the corresponding application program in Step S408, the CPU 51 activates the corresponding application program (hereinafter, the MFP driver designated by the application program information (corresponding MFP driver)) (Step S409). After that, the information processing apparatus is operated by executing the application program (corresponding MFP driver) activated in the above. In the confirmation processing of the access right, the CPU 51 executes the corresponding MFP driver to acquire the collating information to be collated with the condition information registered in the management server (Step S410). For instance, the CPU 51 makes the display device of the concerned information processing apparatus display an inputting screen, which accepts the user's operation for inputting the user ID and/or the password, so as to acquire the user ID or the password, serving as one of the collating information, inputted by the user. Further, the CPU 51 acquires the terminal device ID from the system information of the information processing apparatus concerned.

Still successively, the CPU 51 executes the corresponding MFP driver so as to create Command signal 4 that includes the collating information acquired and the restricted file ID included in the header 42 (Step S411). Command signal 4 serves as such a command signal that requests an operation for providing a key of cryptograph to be used for decrypting the encrypted data 41. The CPU 51 further executes the corresponding MFP driver so as to transmit Command signal 4 to the management server represented by the confirming destination information (address information) included in the header 42 of the restricted file 40 (Step S412).

On the other hand, when determining that Command signal 4 has been received (Step S321 shown in FIG. 19; Yes), the CPU 21 of the image forming apparatus 20, serving as the management server, sends Ack signal 4 back to the sender of Command signal 4 (Step S322). After that, the CPU 21 reads out the condition information registered in the management table 37 while correlating them with the restricted file ID included in Command signal 4 currently received, and then, compares the concerned condition information with the collating information included in Command signal 4 currently received, so as to determine whether or not the implementation of the decrypting operation should be allowed (Step S323).

Successively, when determining that the implementation of the decrypting operation should be allowed (presence of the access right) (Step S324 shown in FIG. 19; Yes), the CPU 21 of the image forming apparatus 20, serving as the management server, transmits Result signal 4 including the concerned key of cryptograph to the information processing apparatus serving as the sender of Command signal 4 (Step S325), and then, finalizes the processing (END). While, when determining that the implementation of the decrypting operation should be not allowed (absence of the access right) (Step S324; No), the CPU 21 transmits Result signal 4 including the confirmation result representing the absence of the access right to the information processing apparatus serving as the sender of Command signal 4 (Step S326), and then, finalizes the processing (END).

Still successively, when determining that Ack signal 4 cannot be received yet at the time when a predetermined time interval has elapsed since Command signal 4 has been transmitted to the image forming apparatus 20 concerned (Step S413 shown in FIG. 18; Yes and Step S414; No), the CPU 51 of the information processing apparatus deactivates the corresponding MFP driver so as to finalize the processing concerned (END).

Still successively, when determining that Ack signal 4 is received before the predetermined time interval has elapsed since Command signal 4 has been transmitted to the image forming apparatus 20 concerned (Step S413 shown in FIG. 18; No and Step S414; Yes), the CPU 51 of the information processing apparatus waits a reception of Result signal 4 including the processing result of Command signal 4 (Step S415; No and Step S414; No). When determining that Result signal 4 cannot be received yet at the time when a predetermined time interval has elapsed since Ack signal 4 has been received from the image forming apparatus 20 concerned (Step S415; Yes and Step S416; No), the CPU 51 of the information processing apparatus deactivates the corresponding MFP driver so as to finalize the processing concerned (END).

Still successively, when determining that Result signal 4 is received before the predetermined time interval has elapsed since Ack signal 4 has been received from the image forming apparatus 20 concerned (Step S415; No and Step S416; Yes), the CPU 51 creates a copy of the encrypted data 41 (Step S417), and employs the key of cryptograph for decrypting the created copy of the encrypted data 41 so as to generate decrypted data, and deletes the concerned key of cryptograph immediately after the decrypting operation has been completed (Step S418). After that in the above case, the CPU 51 continues to activate the corresponding MFP driver so as to implement various operations for monitoring (tracing) the decrypted data as the background monitoring operations.

As described in the foregoing, since the header 42 of the restricted file 40 includes the confirming destination information of the access right, it becomes possible for the user to inquire a presence or absence of the access right from any arbitral one of the management servers residing within the system concerned, by using the confirming destination information abovementioned. Further, since the management server performs the operation for confirming the access right, it becomes possible to change the allowability condition at any time. Accordingly, it is possible to change the allowability condition in regard to the decrypting operation, etc., as needed, even after the restricted file 40 is outputted, and as a result, it becomes possible to give an aspect of the flexible and robust security to the encrypted data.

Figure 20:
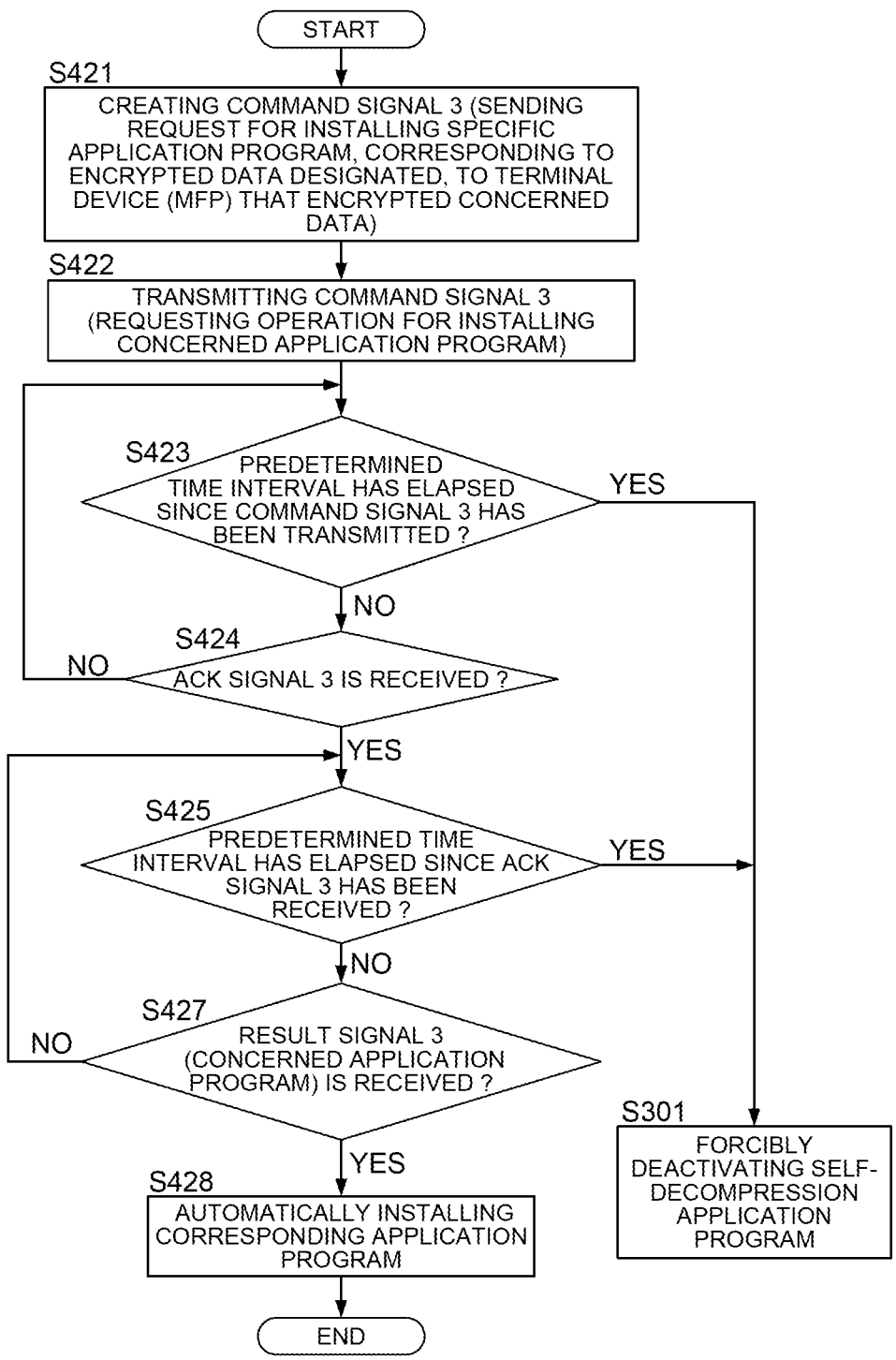
FIG. 20 shows a flowchart indicating an installation request processing flow for installing a corresponding application program, which is to be conducted by an information processing apparatus embodied in the present invention.
Figure 21:
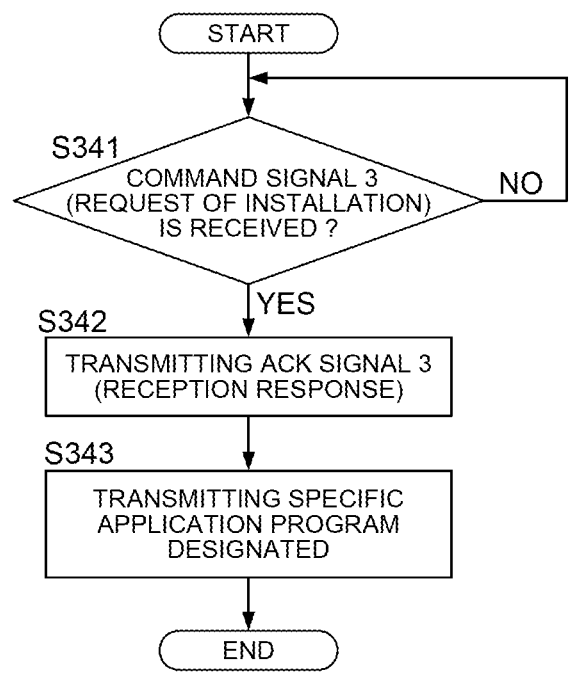
FIG. 21 shows a flowchart indicating operations to be conducted by a management server that has received an installation request from a terminal device.

FIG. 20 shows a flowchart indicating the installation request processing flow for installing the corresponding application program. Further, FIG. 21 shows another flowchart indicating the operations to be conducted by the management server (image forming apparatus 20) when receiving the installation request. Initially, the CPU 51 of the information processing apparatus (terminal device 10) executes the self-decompression application program 43 so as to create Command signal 3 including the request for transferring a specific application program indicated by the application program information included in the header 42 of the restricted file 40 (Step S421), and then, transmits Command signal 3 to the image forming apparatus 20 having the address indicated by the confirming destination information (address information of the management server concerned) included in the header 42 of the restricted file 40 (Step S422).

Successively, when determining that Command signal 3 is received (Step S341 shown in FIG. 21; Yes), the CPU 21 of the image forming apparatus 20 (management server) transmits Ack signal 3, corresponding to Command signal 3, to the sender of the Command signal 3 concerned (Step S342). Still successively, the CPU 21 transmits the specific application program, designated by the Command signal 3 (herein, the MFP driver for the image forming apparatus 20 concerned), to the sender of Command signal 3 concerned (Step S343), and then, finalizes the processing (END).

On the other hand, when determining that Ack signal 3 cannot be received yet at the time when a predetermined time interval has elapsed since Command signal 3 has been transmitted to the image forming apparatus 20 concerned (Step S424 shown in FIG. 20; No and Step S423; Yes), the CPU 51 of the information processing apparatus forcibly deactivates the self-decompression application program 43 due to an error status (Step S426).

When determining that Ack signal 3 is received before the predetermined time interval has elapsed since Command signal 3 has been transmitted to the image forming apparatus 20 concerned (Step S423; No and Step S424; Yes), the CPU 51 of the information processing apparatus waits a reception of Result signal 3 including the processing result of Command signal 3. When determining that Result signal 3 cannot be received yet at the time when a predetermined time interval has elapsed since Ack signal 3 has been received from the image forming apparatus 20 concerned (Step S425; Yes), the CPU 51 forcibly deactivates the self-decompression application program 43 due to an error status (Step S426).

Still successively, when determining that Result signal 3 is received before the predetermined time interval has elapsed since Ack signal 3 has been received from the image forming apparatus 20 concerned (Step S427; Yes), the CPU 51 installs the corresponding application program, included in the Result signal 3 concerned, into the information processing apparatus concerned (Step S428), and then, finalizes the processing (END).

As described in the foregoing, since the corresponding application program can be acquired from the management server as needed, it becomes possible to suppress the capacity of the restricted file 40 at a minimum level, compared to such a conventional case that the application program is included in the restricted file 40. Further, since the application program is acquired from the management server, it becomes possible to flexibly cope with the update of the application program and/or the update of the program version concerned.

Figure 22:
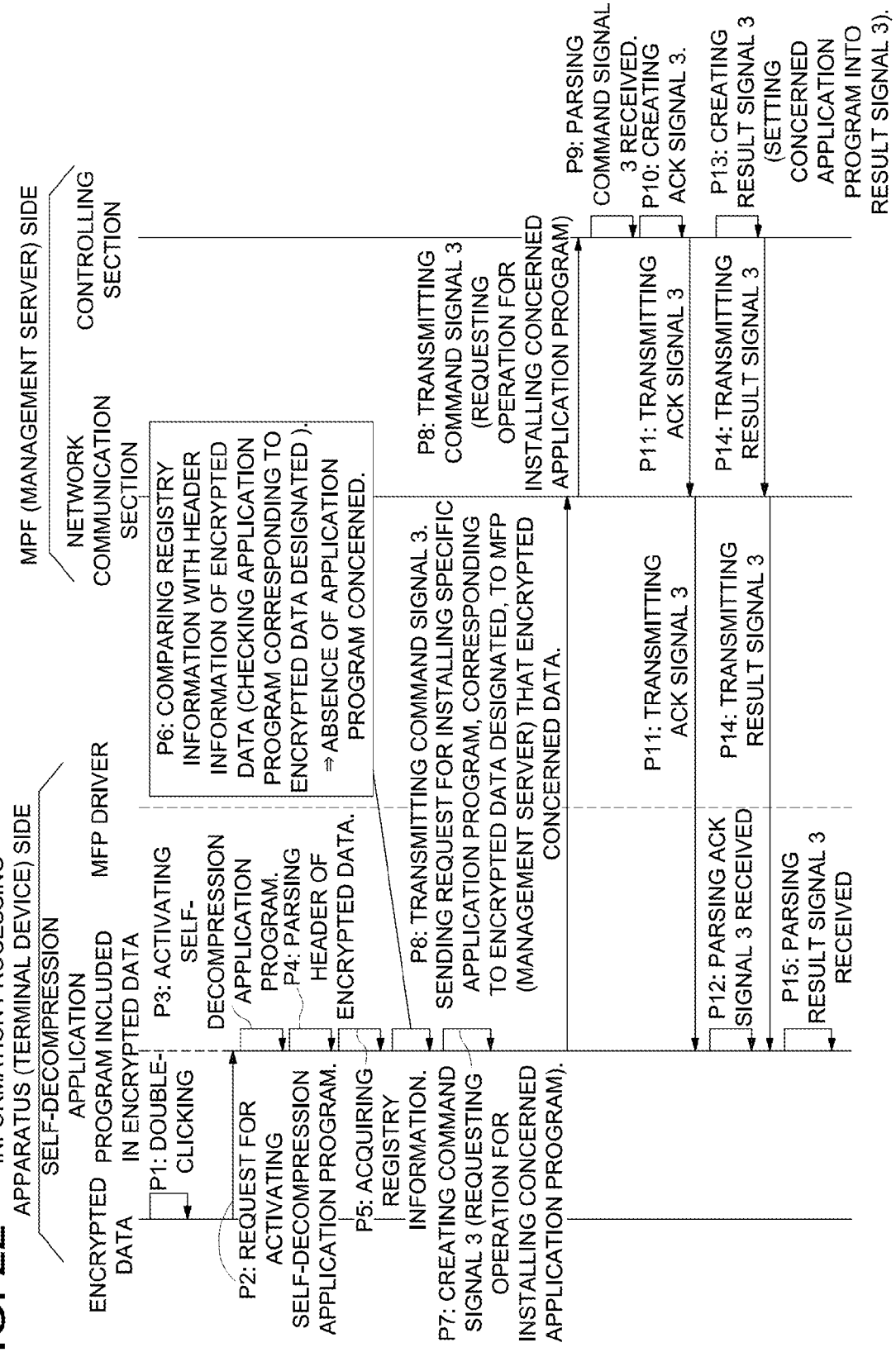
FIG. 22 shows a sequential diagram, indicating operations to be conducted when a corresponding application program is not installed (Step S407; No) in the flowchart shown in FIG. 18.
Figure 23:
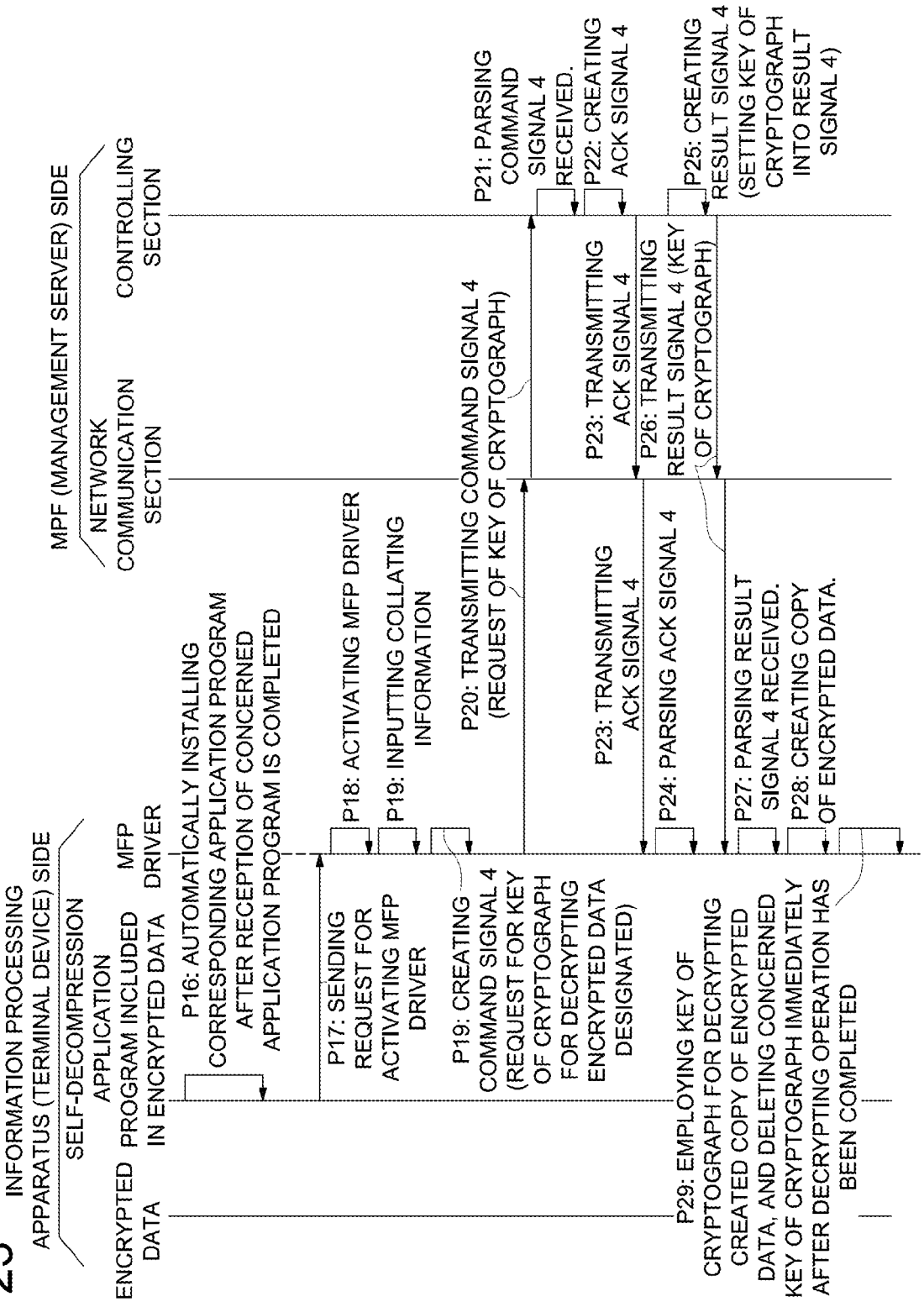
FIG. 23 shows a continued sequential diagram, indicating operations to be continued from those shown in FIG. 22.
Figure 24:
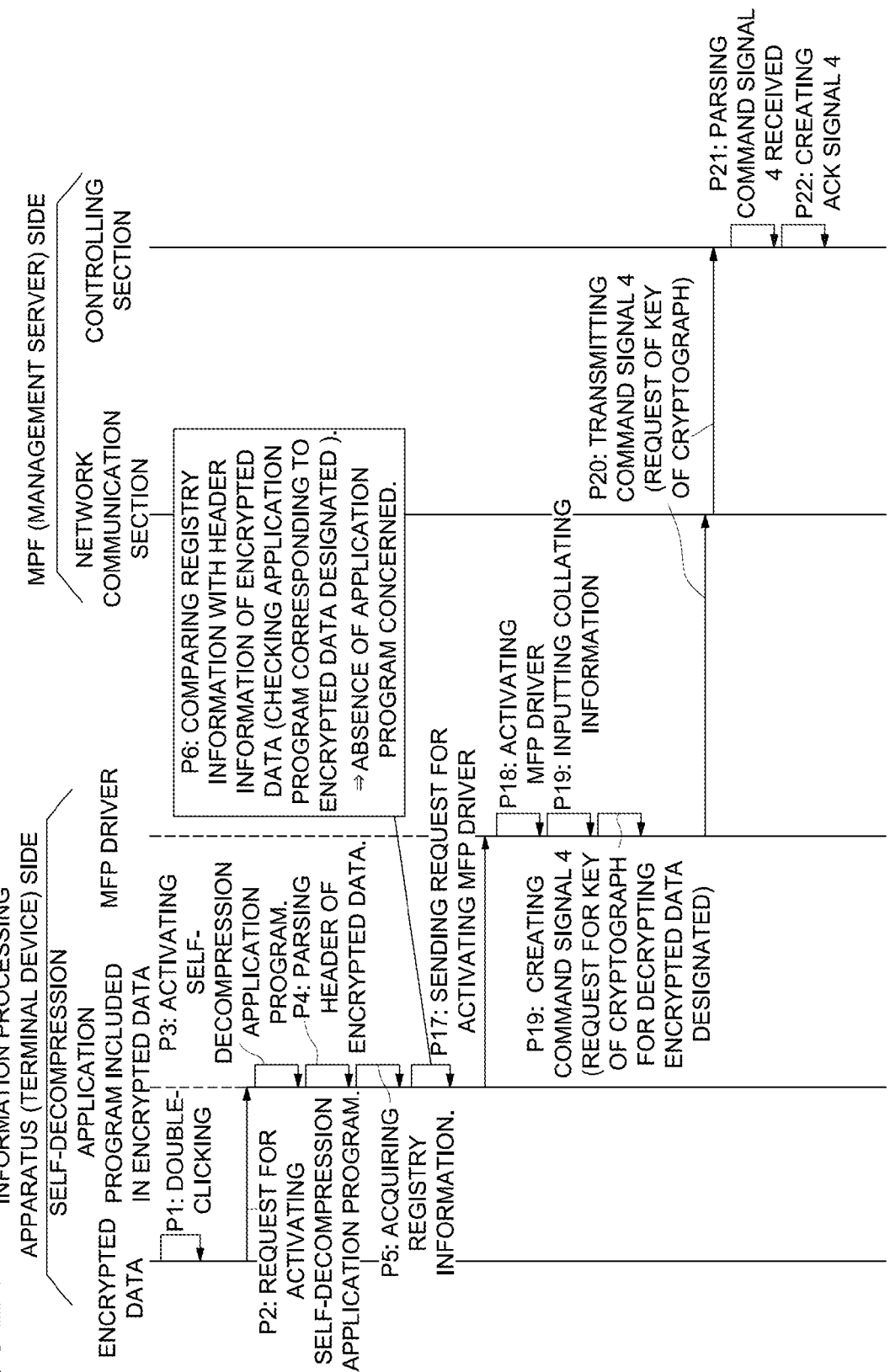
FIG. 24 shows a sequential diagram, indicating operations to be conducted when a corresponding application program is already installed (Step S407; Yes) in the flowchart shown in FIG. 18.
Figure 25:
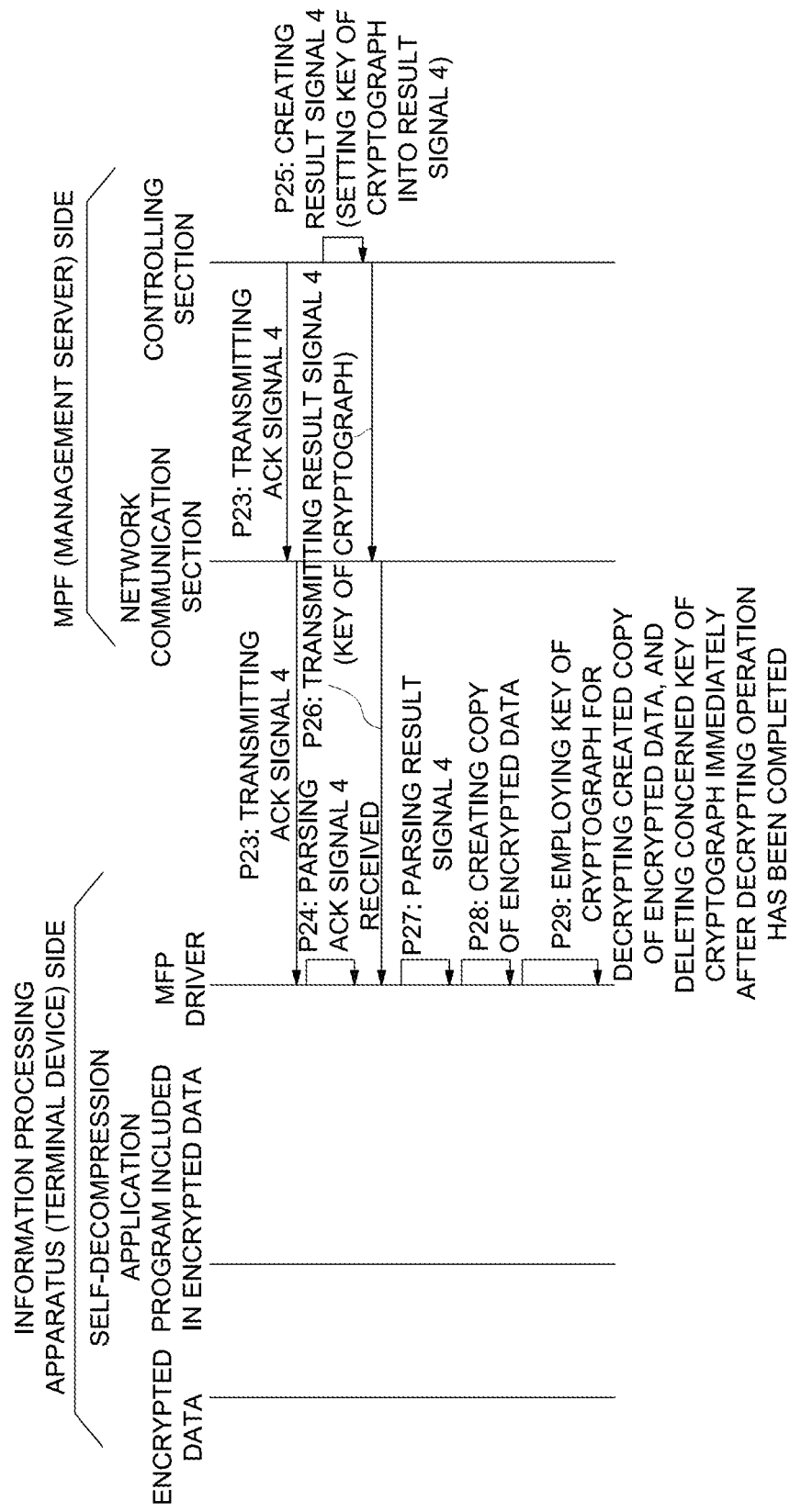
FIG. 25 shows a continued sequential diagram, indicating operations to be continued from those shown in FIG. 24.

FIG. 22 and FIG. 23 respectively show a sequential diagram and its continued sequential diagram, both indicating operations to be conducted when the corresponding application program is not installed (Step S407; No) in the flowchart shown in FIG. 18. Further, FIG. 24 and FIG. 25 respectively show another sequential diagram and its continued sequential diagram, both indicating operations to be conducted when the corresponding application program is already installed (Step S407; Yes) in the flowchart shown in FIG. 18.

Figure 26:
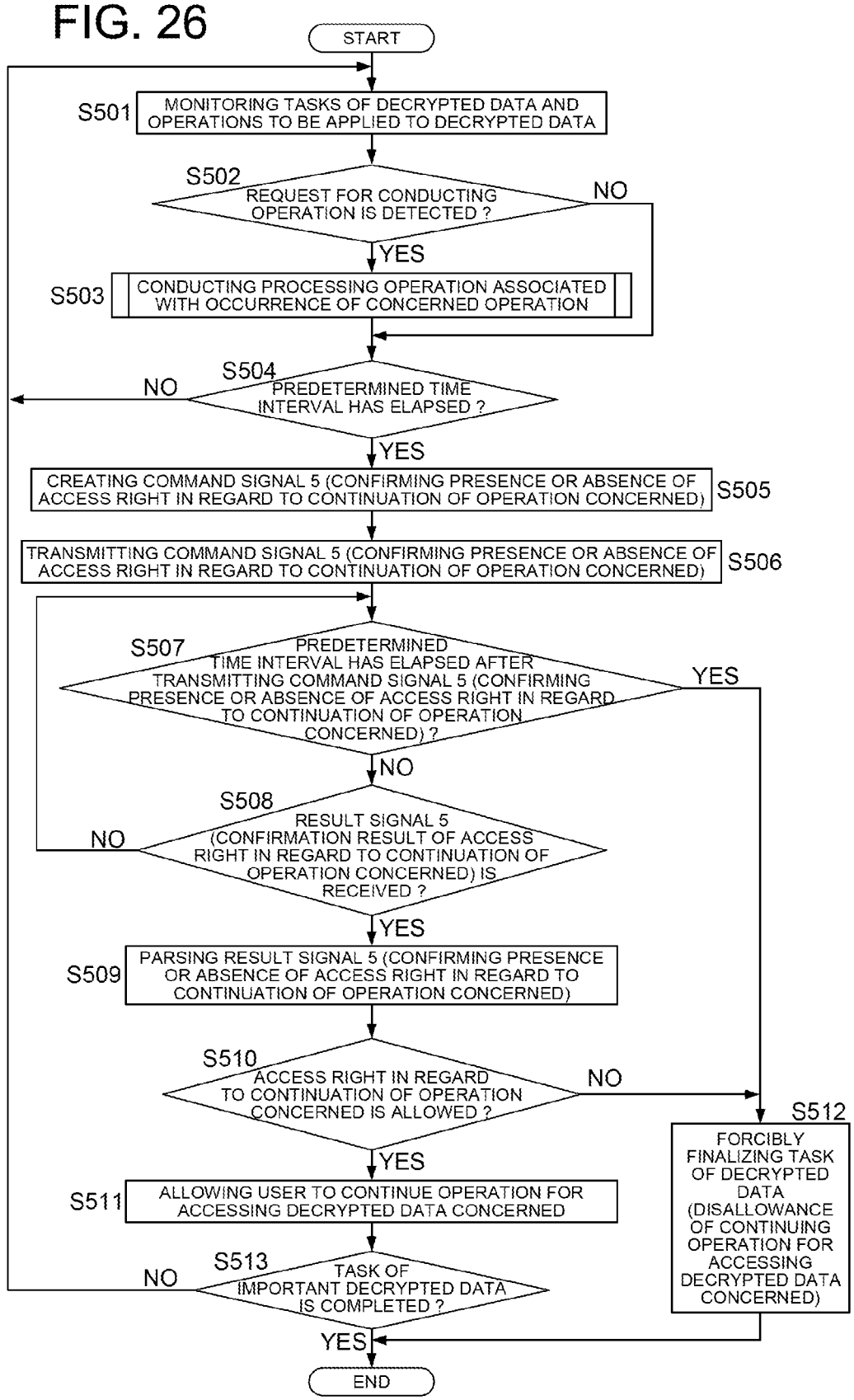
FIG. 26 shows a flowchart indicating processing to be conducted by executing an application program for monitoring operations to be applied to decrypted data.
Figure 27:
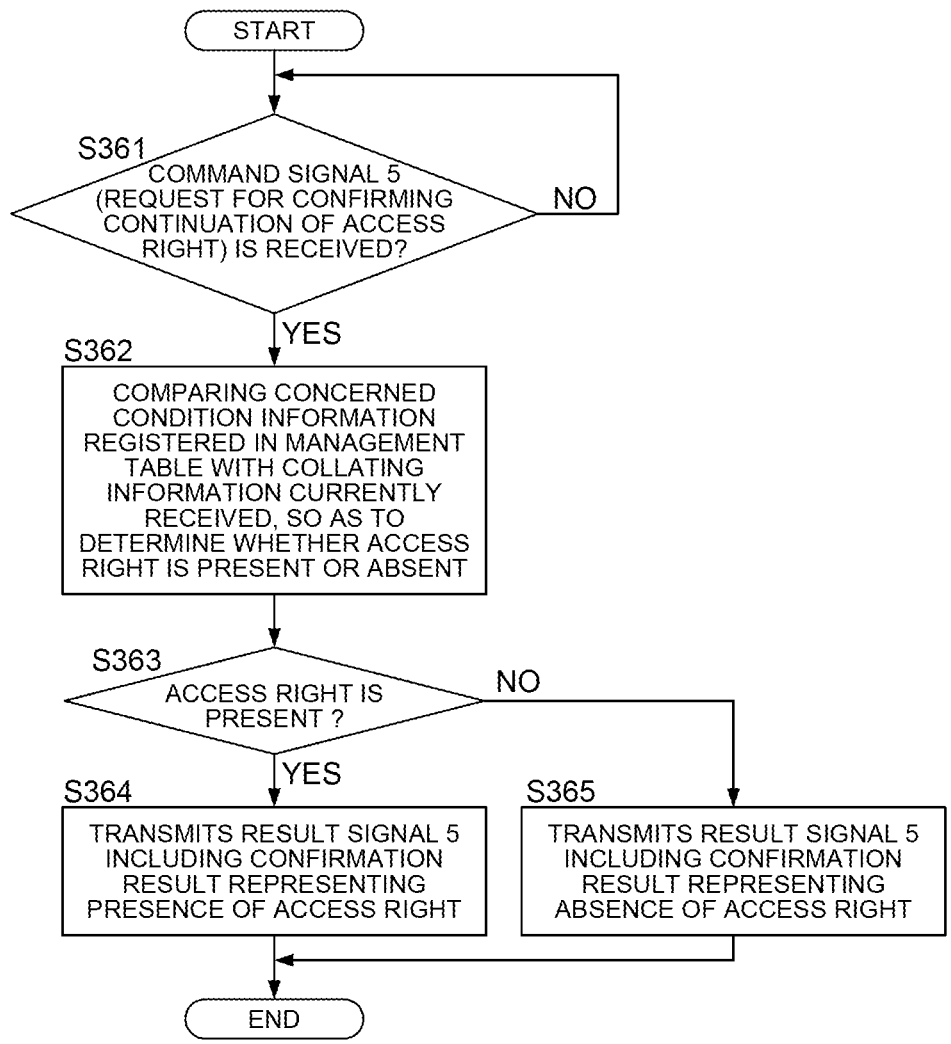
FIG. 27 shows a flowchart indicating processing to be conducted by a management server that receives a request for confirming an access right from a terminal device.

FIG. 26 shows a flowchart indicating the processing to be conducted by executing the application program for monitoring the operations to be applied to the data acquired by decrypting the encrypted data (hereinafter, referred to as the decrypted data). Further, FIG. 27 shows another flowchart indicating the processing to be conducted by the management server that confirms the access right in regard to the processing in the flowchart shown in FIG. 26.

The CPU 51 of the information processing apparatus monitors (traces) the tasks of the decrypted data and the operations to be applied to the decrypted data by executing the application program activated in Step S409 shown in FIG. 18 (Step S501). Accordingly, when detecting a request for conducting any one of various kinds of operations, such as a commencement of accessing operation, an operation for shifting currently accessing page, an implementation of printing, a correcting operation (change operation), a copy operation, etc., (Step S502; Yes), the CPU 51 conducts processing associated with the occurrence of the above-detected request of the concerned operation (Step S503), and then, shifts the processing to Step S504. In this connection, the processing to be conducted in association with the occurrence of the above-detected request of the concerned operation will be detailed later on. When detecting no request for conducting any one of the various kinds of operations (Step S502; No), the CPU 51 directly shifts the processing to Step S504.

In Step S504, the CPU 51 determines whether or not a predetermined time interval (for instance, 10 minutes) has elapsed since the previous operation for confirming the access right has been completed. When determining that the above-predetermined time interval has not elapsed (Step S504; No), the CPU 51 shifts the processing back to Step S501. In this connection, the initial operation for confirming the access right has been completed on the occasion for requesting the key of cryptograph. When determining that the predetermined time interval has elapsed since the previous operation for confirming the access right (Step S504; Yes), the CPU 51 again conducts the operation for confirming the access right.

Concretely speaking, the CPU 51 creates Command signal 5 for requesting the operation for confirming the access right in regard to the continuation of an operation, such as an operation for accessing the decrypted data, etc., (Step S505), and then, transmits the created Command signal 5 to the management server indicated by the confirming destination information included in the header 42 (Step S506). As well as Command signal 4, Command signal 5 includes collating information necessary for confirming the access right and the restricted file ID. On that occasion, the CPU 51 makes the display device 57 display the inputting screen so as to request the user to again input the collating information, such as a user ID, a password, etc. In this connection, when the convenience is an important factor of the system concerned, it is also applicable that the system is so constituted that the collating information previously inputted is again employed as it is, without requesting the reentry of them.

On the other hand, when determining that Command signal 5 has received (Step S361 shown in FIG. 27; Yes), the CPU 21 of the image forming apparatus 20 (management server) reads out the condition information registered in the management table 37 while correlating them with the restricted file ID included in Command signal 5 currently received, and then, compares the concerned condition information with the collating information included in Command signal 5 currently received, so as to determine whether the access right is present or absent (whether or not the continuation of the operation should be allowed) (Step S362).

Successively, when determining that the access right is present (Step S363 shown in FIG. 27; Yes), the CPU 21 of the image forming apparatus 20, serving as the management server, transmits Result signal 5 including the confirmation result representing the presence of the access right (allowance of the continued operation) (Step S364), and then, finalizes the processing (END). While, when determining that the access right is absent (Step S363; No), the CPU 21 transmits Result signal 5 including the confirmation result representing the absence of the access right (disallowance of the continued operation) (Step S365), and then, finalizes the processing (END).

Still successively, when determining that Result signal 5 corresponding to Command signal 5 is received before a predetermined time interval has elapsed since Command signal 5 has been transmitted to the image forming apparatus 20 concerned (Step S508 shown in FIG. 26; Yes), the CPU 51 of the information processing apparatus parses Result signal 5 concerned (Step S509). When determining that Result signal 5 includes confirmation result representing the presence of the access right (Step S510; Yes), the CPU 51 allows the user to continue the operation for accessing the decrypted data (Step S511). After that, the CPU 51 further determines whether or not the task of the decrypted data is completed (Step S513). When determining that the task of the decrypted data is not completed yet (Step S513; No), the CPU 51 shifts the processing back to the Step S501 so as to continue the monitoring operation. While, when determining that the task of the decrypted data is completed (Step S513; Yes), the CPU 51 finalizes the processing (END). In this connection, the present embodiment is so constituted that the decrypted data should be deleted at the time when the task is finalized.

Still successively, when determining that Result signal 5 cannot be received before the predetermined time interval has elapsed (Step S508; No, Step S507; Yes), and when determining that Result signal 5 includes confirmation result representing the absence of the access right (Step S510; No), the CPU 51 forcibly finalizes the task of the decrypted data (Step S512), and finalizes the whole processing (END). In this connection, it is also applicable that the present embodiment is so constituted that the decrypted data is automatically deleted at the time when the task of the decrypted data is forcibly finalized.

As described in the foregoing, during the operation for accessing the decrypted data, the operation for confirming the access right is periodically performed at every time when a predetermined time interval has elapsed. For instance, in such a case that an allowable term is established as the condition for allowing the access right, if the allowable term has elapsed during the continuous operation for accessing the decrypted data, the CPU 51 immediately determines that the access right has become absent at the timeout point of the allowable term, and forcibly finalizes (banns) the accessing operation. Further, in case that the decrypted data is left in a freely accessible state, since the operation for confirming the access right is periodically performed at predetermined time intervals so as to request the user to input the collating information (such as a user ID, a password, etc.), it becomes possible to prevent the decrypted data, left in the freely accessible state, from being accessed by an unauthorized user without any permission. Still further, for instance, when it is revealed that the operation for decrypting the encrypted data has been performed by using an illegally acquired password, which is acquired by employing an injustice method or the like, by changing the allowable condition to be established in the management server side, it becomes possible to ban the operation for accessing the illegally decrypted data after that, and accordingly, it becomes possible not only to flexibly cope with various kinds of incidents, but also to maintain a robust security of the system concerned.

Figure 28:
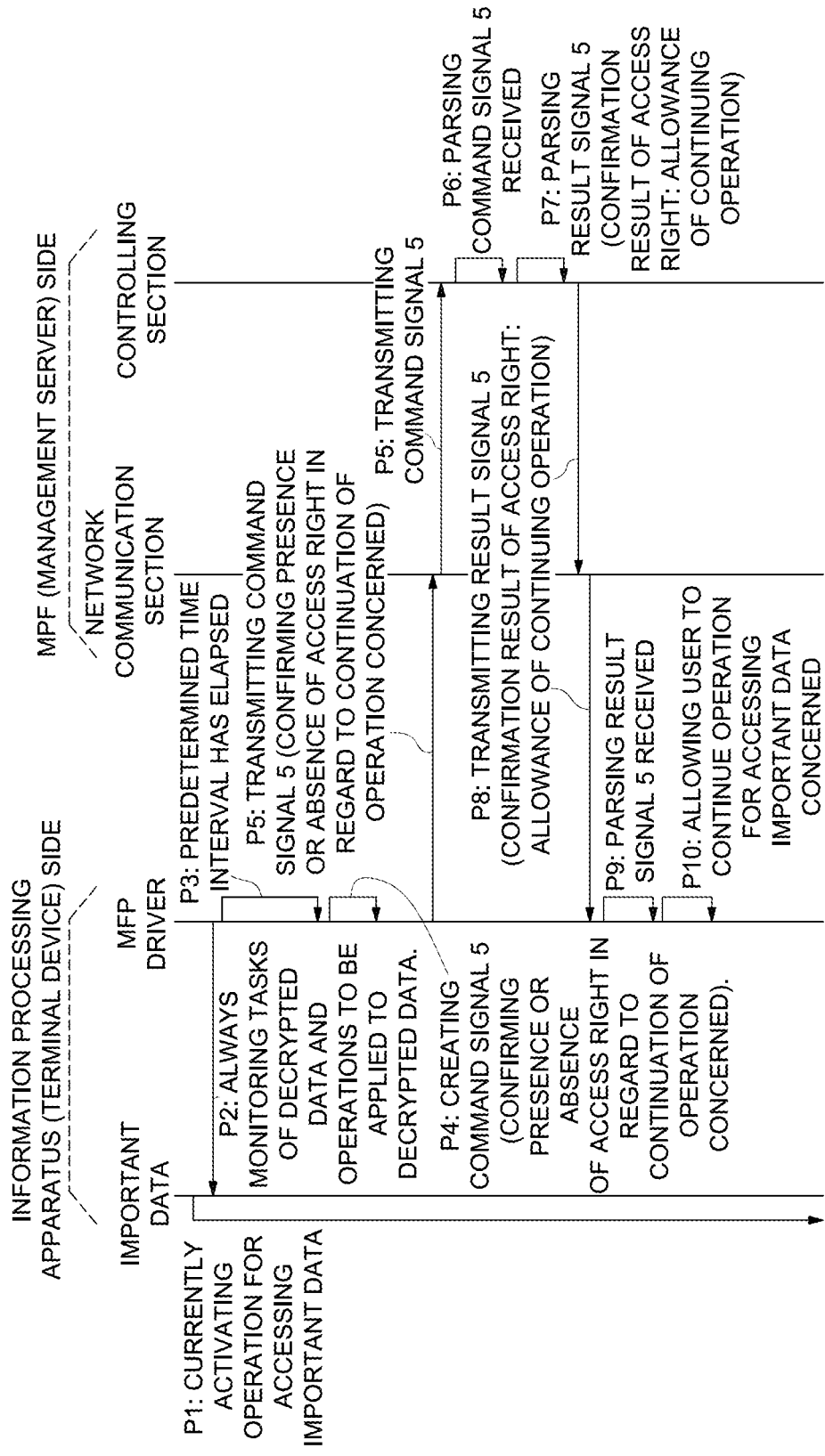
FIG. 28 shows a sequential diagram indicating operations to be conducted when the confirmation result, determined in the flowcharts shown in FIG. 26 and FIG. 27, represents the presence of the access right.
Figure 29:
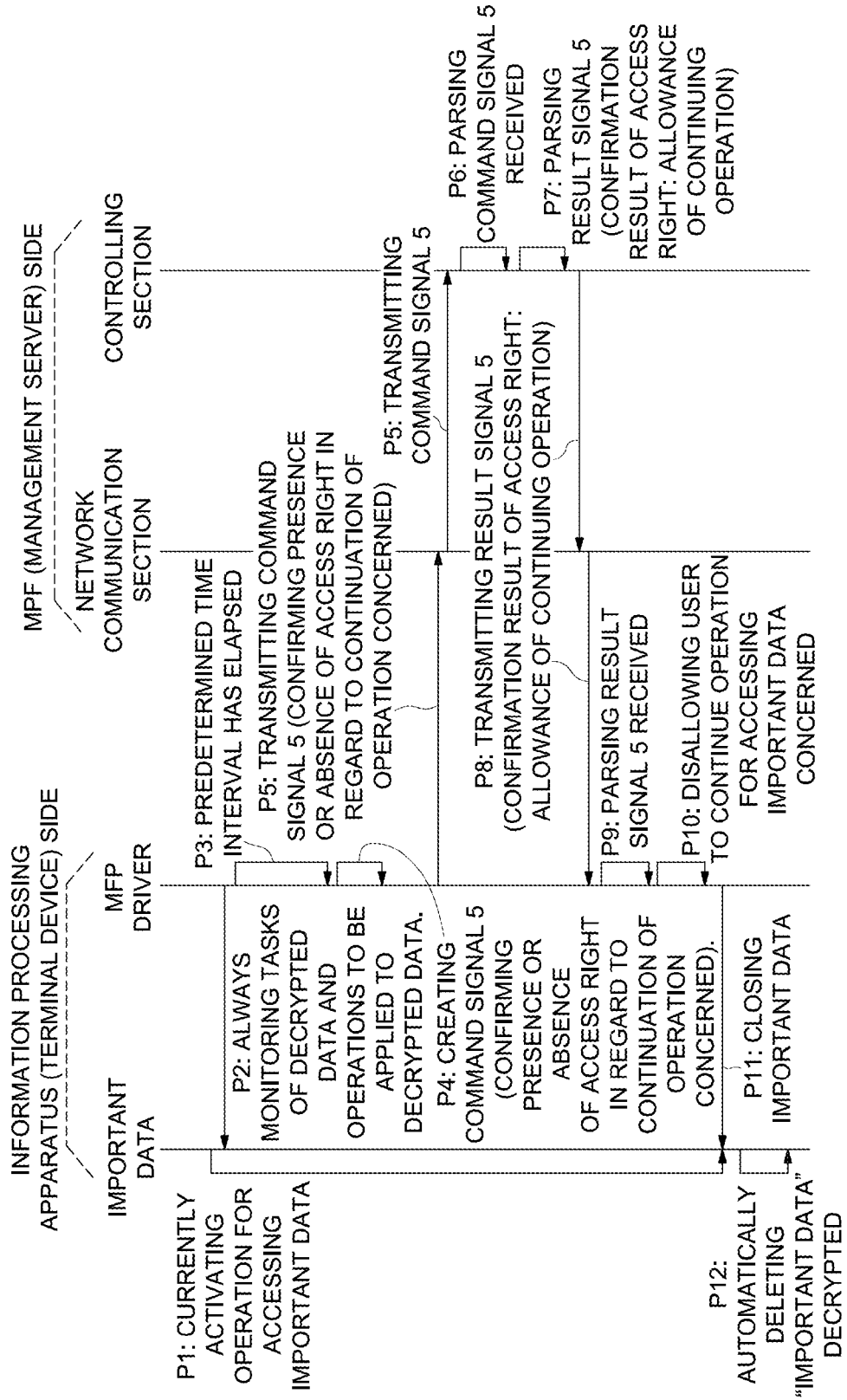
FIG. 29 shows a sequential diagram indicating operations to be conducted when a confirmation result, determined in the flowcharts shown in FIG. 26 and FIG. 27, represents an absence of an access right.
Figure 30:
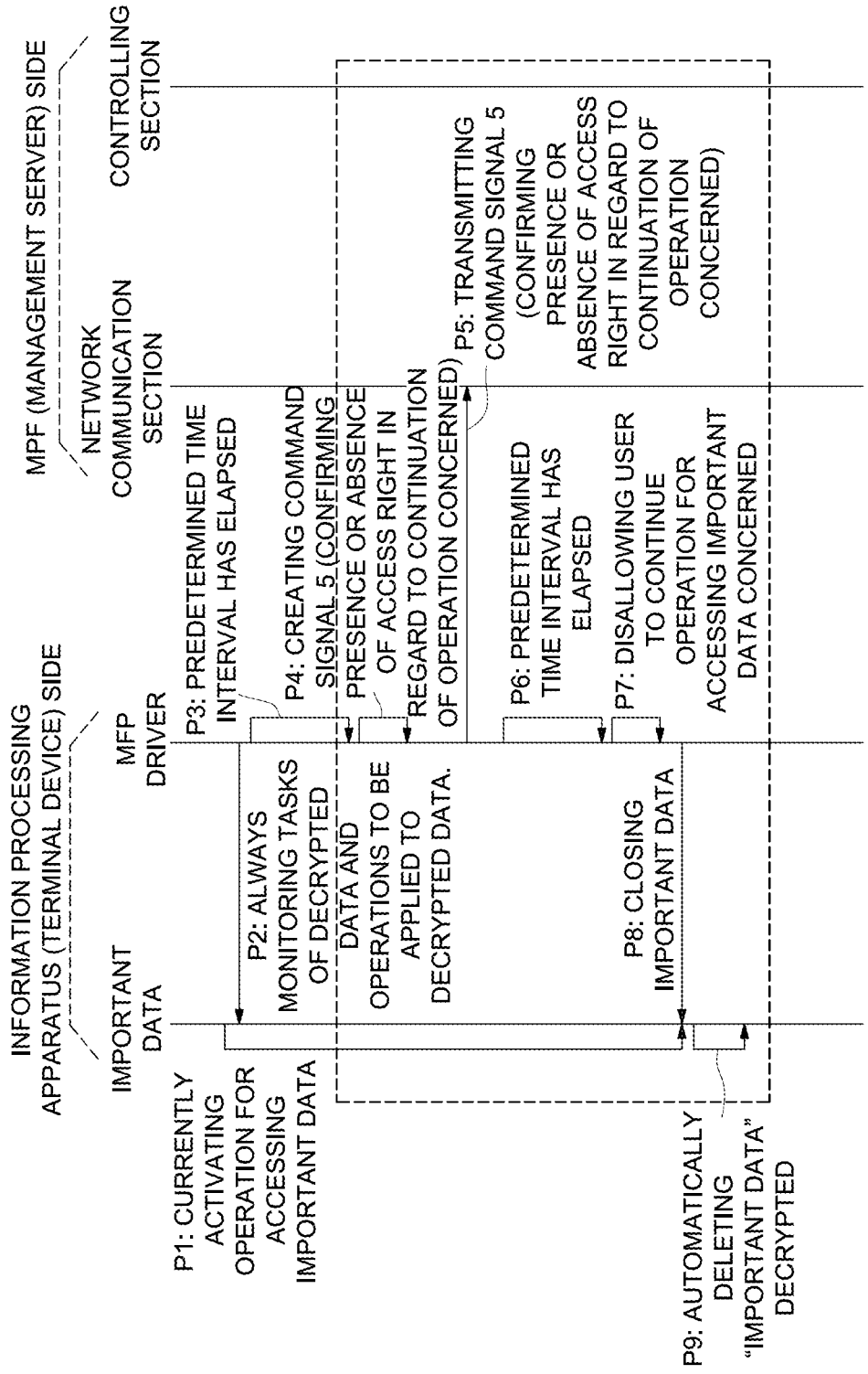
FIG. 30 shows a sequential diagram indicating operations to be conducted when Result signal 5 corresponding to Command signal 5 cannot be received due to a certain communication malfunction, which is determined in the flowcharts shown in FIG. 26 and FIG. 27.

FIG. 28, FIG. 29, and FIG. 30 show sequential diagrams, indicating operations corresponding to the operations indicated in the flowcharts shown in FIG. 26 and FIG. 27. FIG. 28 shows a sequential diagram indicating operations to be conducted when the confirmation result represents the presence of the access right, while, FIG. 29 shows another sequential diagram indicating operations to be conducted when the confirmation result represents the absence of the access right. Further, FIG. 30 shows still another sequential diagram indicating operations to be conducted when Result signal 5 corresponding to Command signal 5 cannot be received due to a certain communication malfunction. In this connection, the rectangular area, surrounded by the broken lines shown in FIG. 30, indicates a term within which the communication malfunction has been in its disrepair state.

Figure 31:
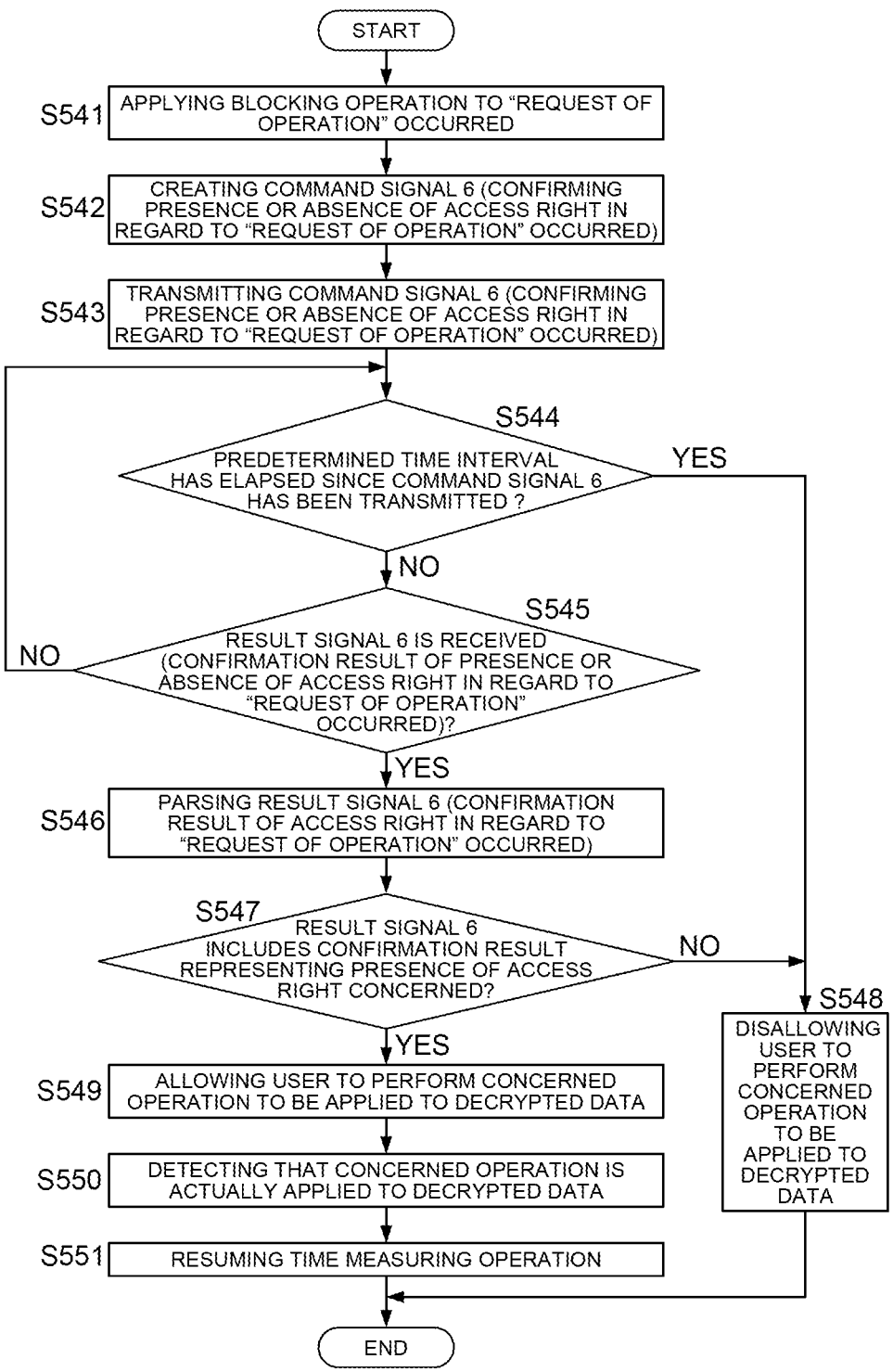
FIG. 31 shows a flowchart indicating a flow of processing to be conducted in association with an occurrence of an operation request (processing corresponding to Step S503 shown in FIG. 26) among actions to be conducted by executing an application program for monitoring operations to be applied to decrypted data.

FIG. 31 shows a flowchart indicating a flow of processing to be conducted in association with the occurrence of the operation request (processing corresponding to Step S503 shown in FIG. 26). Initially, by executing the application program for monitoring the operations, the CPU 51 of the information processing apparatus concerned applies the blocking operation to the operation in regard to the operation request occurred, so as to ban the implementation of the concerned operation (Step S541). Successively, the CPU 51 creates Command signal 6 for requesting the operation for confirming the access right in regard to the operation occurred (Step S542), and transmits above-created Command signal 6 to the management server indicated by the confirming destination information included in the header 42 (Step S543). In this connection, as well as Command signal 5, Command signal 6 includes the collating information being necessary for confirming the access right and the restricted file ID. Further, on that occasion, the CPU 51 makes the display device 57 display the inputting screen so as to request the user to again input the collating information, such as a user ID, a password, etc. Still further, when the convenience is an important factor of the system concerned, it is also applicable that the system is so constituted that the collating information previously inputted is again employed as it is, without requesting the reentry of them.

On the other hand, receiving Command signal 6 sent from the information processing apparatus, the CPU 21 of the image forming apparatus 20 (management server) performs the processing same as those shown in FIG. 27 (however, Command signal 5 is replaced by Command signal 6), so as to transmit Result signal 6 including the confirmation result of either the presence of the access right or the absence of the access right.

Successively, when determining that Result signal 6 corresponding to Command signal 6 is received before a predetermined time interval has elapsed since Command signal 6 has been transmitted to the image forming apparatus 20 concerned (Step S545 shown in FIG. 31; Yes), the CPU 51 of the information processing apparatus parses Result signal 6 concerned (Step S546). When determining that Result signal 6 includes confirmation result representing the presence of the access right (Step S547; Yes), the CPU 51 allows the user to perform the concerned operation to be applied to the decrypted data (Step S549). After that, the CPU 51 detects that the concerned operation is actually applied to the decrypted data (Step S550), and then, resumes the time measuring operation in regard to the determination in Step S504 shown in FIG. 26 (Step S551), and finally, finalizes the whole processing (END).

Still successively, when determining that Result signal 6 cannot be received before the predetermined time interval has elapsed (Step S545; No, Step S544; Yes), and when determining that Result signal 6 includes confirmation result representing the absence of the access right (Step S547; No), the CPU 51 determines that the concerned operation to be applied to the decrypted data is disallowable, so as to ban the implementation of the concerned operation (Step S548) and finalizes the whole processing (END). In this connection, it is also applicable that the system is so constituted that a message, for notifying the user on the current operation of the fact that the concerned operation has been banned, is displayed on the display device 57.

Figure 32:
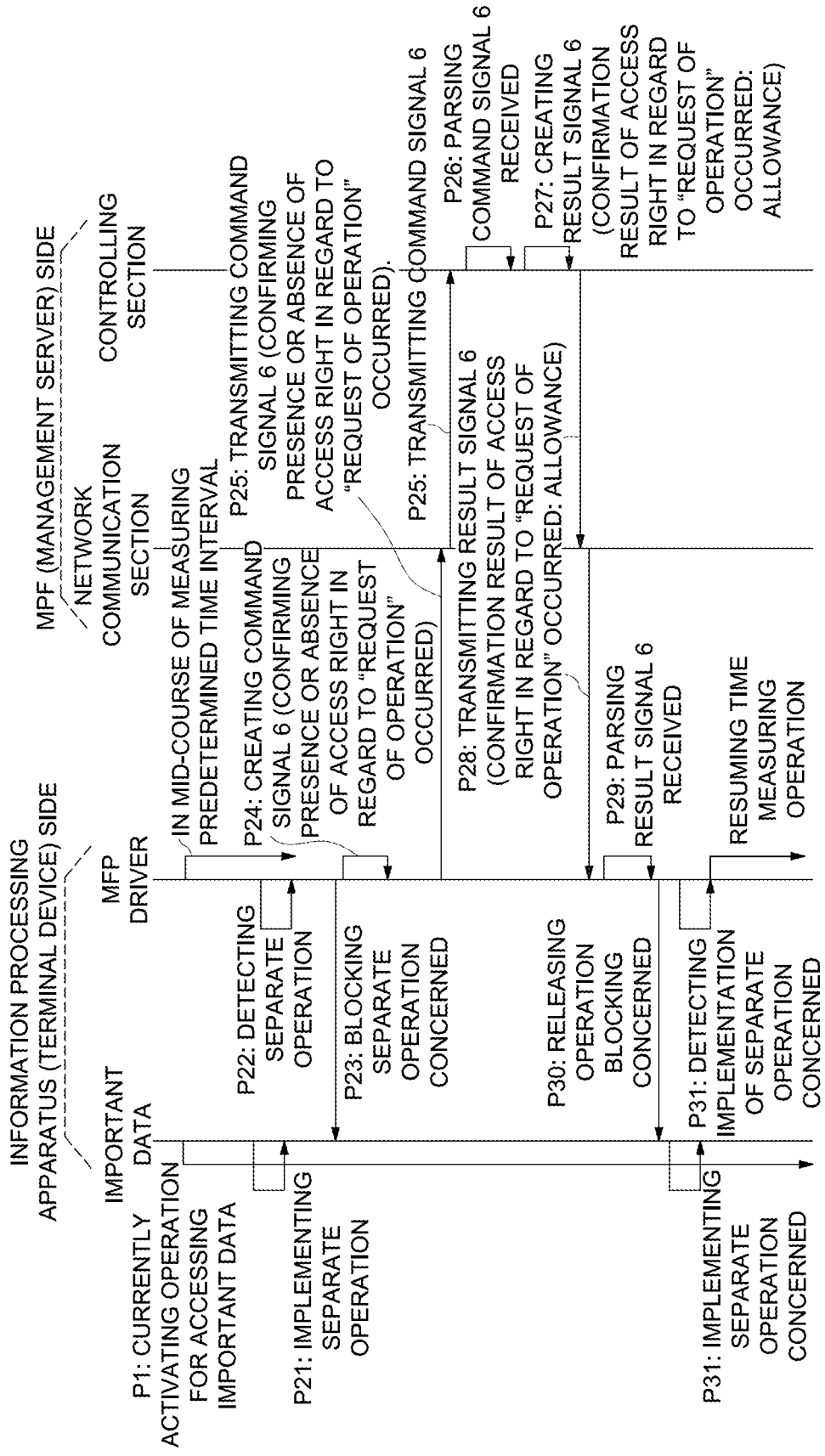
FIG. 32 shows a sequential diagram, indicating operations corresponding to operations indicated in the flowchart shown in FIG. 31.

FIG. 32 shows a sequential diagram, indicating operations corresponding to the operations indicated in the flowchart shown in FIG. 31.

As described in the foregoing, since, every time when an operation to be applied to the decrypted data occurs, the CPU 51 of the information processing apparatus inquires a presence or absence of the access right in regard to the concerned operation from the management server, it becomes possible to heighten the security aspect of the concerned operation to be applied to the decrypted data. Further, since the management server confirms the presence or absence of the access right, it becomes possible not only to change the allowable conditions at any time as needed, but also to flexibly cope with the request for changing the allowable conditions. For instance, even in such a case that, although the user took out the restricted file 40, created under the disallowable condition that bans the printing operation, to a certain business-trip destination site, it happens to be necessary in the concerned business-trip destination site to implement the printing operation in regard to the restricted file 40 concerned, it becomes possible for the user to request the manager to change the disallowable condition to an allowable condition that allows the user to implement the printing operation by calling the manager on the telephone line or the like. Then, if the manager admits the user's request and changes the disallowable condition to the allowable condition according to the user's request, it becomes possible for the user to implement the printing operation at the concerned business-trip destination site under the allowable condition changed by the manager.

Referring to the drawings, the preferred embodiment of the present invention has been described in the foregoing. However, the scope of the present invention is not limited to the above-described preferred embodiment. Modifications and additions, to be applied to the above-described preferred embodiment by a skilled person without departing from the spirit and subject of the invention, shall be included in the scope of the present invention.

For instance, although the above-described preferred embodiment is so constituted that the self-decompression application program 43 is included in the restricted file 40, another configuration in which the restricted file 40 does not include the self-decompression application program 43 is also applicable in the present invention.

Further, it is also applicable that the above-described preferred embodiment is so constituted that, when the header 42 includes the user information and the apparatus ID, those information are transmitted to the management server as subsidiary information of the collating information.

Still further, although the above-described preferred embodiment is so constituted that the restricted file ID is registered into both the management table 37 and the header 42 of the restricted file 40 so as to confirm the access right for every restricted file under the individual condition, it is also applicable that, when the presence or absence of the access right is determined with respect to each of all restricted files under a common condition, it is not necessary to register the restricted file ID.

Yet further, although the above-described preferred embodiment is so constituted that the CPU 51 of the information processing apparatus automatically collects the terminal device ID, which is to be transmitted to the management server as the collating information, by executing the application program for monitoring the decrypted data, it is also applicable that the system is so constituted that the user inputs the terminal device ID through the inputting screen.

Incidentally, the scope of the allowable objective operations is not limited to those exemplified in the above-described preferred embodiment. Further, the operation for transmitting the decrypted data is defined as one of various kinds of copy operations.

Further, the scope of the confirming destination information is not limited to the address information on the network of the management server, but any kind of information, which makes the operation for accessing the designated management server possible, is available for this purpose. For instance, in such a case that the address information can be acquired from the ID information of the management server (the case that the address information is provided from the ID information by inquiring the known server, etc.), it is applicable that the ID information of the management server can be employed as the confirming destination information.

Still further, although the above-described preferred embodiment is so constituted that the operation for encrypting the original data is performed in the image forming apparatus 20, it is also applicable that the concerned system is so constituted that the above-encrypting operation is performed in another separate apparatus, while the image forming apparatus 20 creates the restricted file 40 including the encrypted data attached with at least the confirming destination information. For instance, in Case 2 aforementioned, it is also applicable that the concerned system is so constituted that the management server transmits the key of cryptograph to the terminal device 10 so that the terminal device 10 encrypts original data by using the above-transmitted key of cryptograph so as to acquire encrypted data and transmits the encrypted data to the image forming apparatus 20, and then, the image forming apparatus 20 creates the restricted file 40 including the above-encrypted data so as to transmit the restricted file 40 back to the terminal device 10 and to register the necessary management information into the management table 37.

Still further, although the above-described preferred embodiment is so constituted that the image forming apparatus 20 is provided with both the function as the restricted file creating apparatus and the other function as the management server, it is also applicable that the concerned system is so constituted that the restricted file creating apparatus and the management server are respectively configured as separate apparatuses. Further, the image forming apparatus 20 is not necessary provided with the function as the restricted file creating apparatus and the other function as the management server, but it is applicable that each of abovementioned apparatuses is separately installed into the concerned system as an exclusive apparatus.

Yet further, although the above-described preferred embodiment is so constituted that the information processing apparatus implements the operation for decrypting the encrypted data, it is also applicable that the information processing apparatus transmits the encrypted data to the management server so that the management server decrypts the encrypted data sent from the information processing apparatus concerned, and then, sends the decrypted data back to the information processing apparatus concerned.

According to the access restricted file and the restricted file creating apparatus, embodied in the present invention, since the access restricted file includes the confirming destination information that represents a management server serving as a confirming destination site to confirm a presence or absence of an access right in regard to the operation for accessing the data, it becomes possible to inquire the presence or absence of the access right from the general purpose information processing apparatus based on the confirming destination information, in order to effectively utilize the data concerned.

While the preferred embodiments of the present invention have been described using specific term, such description is for illustrative purpose only, and it is to be understood that changes and variations may be made without departing from the spirit and scope of the appended claims.

What is claimed is:

1. A non-transitory computer readable storage medium storing a computer executable file comprising:
   restricted access data, wherein an operation for accessing the data is restricted;
   address information, representing an address of an image forming apparatus that output the restricted access data, on a network, the image forming apparatus serving as a confirming destination site to confirm a presence or absence of an access right in regard to the operation for accessing the data, wherein the image forming apparatus acts as a management server;
   driver specifying information specifying a printer driver corresponding to the image forming apparatus; and
   a print driver acquisition program;
   wherein, when the information processing apparatus receives a request for performing a predetermined operation for the restricted access data, the print driver acquisition program, when executed by a computer provided in an information processing apparatus coupled to the image forming apparatus through the network, causes the computer to perform a first process comprising:
   determining whether or not the printer driver, specified by the driver specifying information, has been installed on the information processing apparatus; and
   acquiring the printer driver that corresponds to the image forming apparatus, when determining that the printer driver has not been installed therein; and
   wherein the printer driver, when executed by the computer provided in the information processing apparatus, causes the computer to perform a second process comprising:
   requesting the image forming apparatus corresponding to the address information to confirm the presence or absence of the access right in regard to the data concerned; and
   authorizing the information processing apparatus to perform the predetermined operation when the presence of the access right is confirmed by the image forming apparatus, or prohibiting the information processing apparatus from performing the predetermined operation when the absence of the access right is confirmed by the image forming apparatus.

2. The non-transitory computer readable storage medium of claim 1,
wherein, when a predetermined time interval has elapsed since the predetermined operation has been performed for the data, the printer driver, being executable by the computer provided in the information processing apparatus, causes the computer to perform a third process comprising:
again requesting the image forming apparatus to confirm the presence or absence of the access right in regard to the data concerned, based on the address information thereof; and
continuously authorizing the information processing apparatus to perform the predetermined operation when the presence of the access right is confirmed, or prohibiting the information processing apparatus from further performing the predetermined operation when the absence of the access right is confirmed.

3. The non-transitory computer readable storage medium of claim 2,
wherein the data is encrypted; and
wherein the third process further comprising:
decrypting the data so as to create decrypted data from the data encrypted when the presence of the access right is confirmed, or forcibly terminating a task in regard to the data concerned and deleting the decrypted data when the information processing apparatus is prohibited from further performing the predetermined operation.

4. The non-transitory computer readable storage medium of claim 1,
wherein the predetermined operation is at least one of operations, including commencing an operation for accessing the data, changing accessing pages represented by the data, updating the data, implementing an printing operation based on the data and implementing an copying operation based on the data.

5. The non-transitory computer readable storage medium of claim 1,
wherein the printer driver, being executable by the computer provided in the information processing apparatus, causes the computer to perform a forth process comprising:
inputting collation information to be employed for confirming the presence or absence of the access right; and
adding the collation information to the access restricted file so as to request the information processing apparatus to confirm the presence or absence of the access right.

6. An image forming apparatus that creates an access restricted file and acts as a management server, the image forming apparatus comprising:
a storage section configured to store:
data,
address information representing an address of an image forming apparatus on a network,
driver specifying information to specify a printer driver that corresponds to the image forming apparatus, and
an acquisition program to make an information processing apparatus acquire the printer driver that corresponds to the image forming apparatus,
the information processing apparatus being coupled to the image forming apparatus through the network; and
a processor configured to encrypt the data, so as to create the access restricted file as a single file, including encrypted data generated by encrypting the data, and the address information, the driver specifying information and the acquisition program, which are currently stored in the storage section; and
wherein the address information is confirming destination information representing the management server serving as a confirming destination site to confirm a presence or absence of an access right in regard to the operation for accessing the data;
wherein, when the information processing apparatus receives a request for applying a predetermined operation to the data, the acquisition program is executed by a computer, provided in the information processing apparatus, so as to cause the computer to perform a first process comprising:
determining whether or not the printer driver, specified by the driver specifying information, has been installed in the information processing apparatus concerned; and
acquiring the printer driver, based on the driver specifying information, when determining that the printer driver concerned has not been installed therein; and
wherein the printer driver is executed by the computer, so as to cause the computer to perform a second process comprising:
requesting the image forming apparatus corresponding to the address information to confirm a presence or absence of an access right in regard to the data concerned; and
authorizing the information processing apparatus to perform the predetermined operation when the presence of the access right is confirmed by the image forming apparatus, or prohibiting the information processing apparatus from performing the predetermined operation when the absence of the access right is confirmed by the image forming apparatus.

7. The image forming apparatus of claim 6,
wherein, when a predetermined time interval has elapsed since the predetermined operation has been applied to the data, the printer driver is executed by the computer, so as to cause the computer to perform a third process comprising:
again requesting the image forming apparatus to confirm the presence or absence of the access right in regard to the data concerned, based on the address information thereof; and
continuously authorizing the information processing apparatus to perform the predetermined operation when the presence of the access right is confirmed, or forcibly terminating a task in regard to the data concerned when the information processing apparatus is prohibited from further performing the predetermined operation.

8. The image forming apparatus of claim 6,
wherein the data is encrypted; and
wherein the second process further comprising:
decrypting the data so as to create decrypted data from the data encrypted when the presence of the access right is confirmed, or forcibly terminating a task in regard to the data concerned and deleting the decrypted data when the information processing apparatus is prohibited from further performing the predetermined operation.

9. The image forming apparatus of claim 6, wherein the predetermined operation is at least one of operations, including commencing an operation for accessing the data, changing accessing pages represented by the data, updating the data, implementing an printing operation based on the data and implementing an copying operation based on the data.

10. The image forming apparatus of claim 6, wherein the printer driver, being executable by the computer provided in the information processing apparatus, causes the computer to perform a forth process comprising:

inputting collation information to be employed for confirming the presence or absence of the access right; and adding the collation information to the access restricted file so as to request the information processing apparatus to confirm the presence or absence of the access right.

* * * * *